United States Patent
Kaihoko et al.

(10) Patent No.: US 7,742,127 B2
(45) Date of Patent: Jun. 22, 2010

(54) LIQUID CRYSTAL DISPLAY DEVICE

(75) Inventors: Hiroyuki Kaihoko, Minami-ashigara (JP); Junichi Hirakata, Minami-ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 199 days.

(21) Appl. No.: 11/797,075

(22) Filed: Apr. 30, 2007

(65) Prior Publication Data

US 2007/0258032 A1    Nov. 8, 2007

(30) Foreign Application Priority Data

Apr. 28, 2006    (JP)    ............... 2006-124821

(51) Int. Cl.
*G02F 1/1337*    (2006.01)

(52) U.S. Cl. ..................... 349/106; 349/129

(58) Field of Classification Search .......... 349/127–130
See application file for complete search history.

(56) References Cited

U.S. PATENT DOCUMENTS

| | | | | |
|---|---|---|---|---|
| 5,499,126 A | * | 3/1996 | Abileah et al. | ............ 349/106 |
| 6,856,368 B2 | * | 2/2005 | Terashita et al. | ............ 349/129 |
| 7,023,510 B2 | * | 4/2006 | Okamoto et al. | ............ 349/113 |
| 2008/0113112 A1 | * | 5/2008 | Ikeda et al. | ................. 428/1.1 |

FOREIGN PATENT DOCUMENTS

| | | |
|---|---|---|
| JP | 05-196931 A | 8/1993 |
| JP | 2001-242460 A | 9/2001 |
| JP | 2002-221622 A | 8/2002 |

OTHER PUBLICATIONS

An Office Action issued in corresponding Chinese Application No. 2007101019274 on Aug. 7, 2009.

* cited by examiner

*Primary Examiner*—Frank G Font
*Assistant Examiner*—Eric Wong
(74) *Attorney, Agent, or Firm*—Buchanan Ingersoll & Rooney PC

(57) ABSTRACT

A novel liquid crystal display device is disclosed. It comprises, at least, a pair of polarizing plates, and a liquid crystal cell, disposed between the pair of polarizing plates, comprising a pair of substrates opposed to each other, electrodes disposed on at least one of the pair of substrates, capable of forming an electric field including a component parallel to the pair of substrates, liquid crystal layer, of which alignment is controlled, disposed between the pair of substrates, a plurality of pixel regions respectively having first, second and third pixels, and a plurality of color filter layers, respectively having first, second and third color filter layers, each corresponding to the first, second and third pixel regions, wherein $R_{th}$ is different between at least two of the first, second and third color filter layers.

6 Claims, 3 Drawing Sheets

OFF state          ON state

LIQUID CRYSTAL DISPLAY DEVICE

CROSS-REFERENCE TO RELATED APPLICATIONS

This application claims benefit of priority under 35 U.S.C. 119 to Japanese Patent Application No. 2006-124821 filed Apr. 28, 2006, and the entire contents of which are incorporated herein by reference.

BACKGROUND OF THE INVENTION

1. Field of the invention

The present invention relates to a liquid crystal display device having wide viewing angle characteristics and showing excellent color reproducibility over a wide range of viewing angle.

2. Related Art

Displays employing liquid crystal display device (also referred to as liquid crystal display panel), electroluminescence device (classified into organic types and inorganic types depending on fluorescent materials to be adopted, referred to as EL device, hereinafter), field emission device (referred to as FED device, hereinafter) and electrophoretic device, can display images, without a space (vacuum tube) such as a cathode ray tube (CRT), which is necessary for two-dimensional scanning of electron beam, on the back side of the display screen. These display devices are, therefore, characterized by their thinness, light weight, and low power consumption as compared with a display device employing a CRT. These display devices are occasionally called flat panel displays, based on the feature of their appearances.

By virtue of the above-described advantages over cathode ray tubes, the display devices employing liquid crystal display device, EL device or field emission display device are becoming widely disseminated in various applications including office automation equipment such as monitors of notebook-type personal computers and other personal computers, mobile terminals and television sets, in replacing a display device employing a CRT. Accelerated displacement of CRT-displays with flat panel displays is supported by technical innovation which relates to improvement in image quality, such as viewing angle characteristics and expansion of display range ensuring color reproducibility. In recent years, improvement has also been made on display performance of motion picture, driven by dissemination of multi-media and the Internet. The flat panel display are also launched in fields of electronic paper and large-sized information display for public use or advertisement, which could not have been realized by CRT-displays.

A liquid crystal display device generally comprises a liquid crystal cell, a drive circuit applying display signal voltage to the liquid crystal cell, a back light, and a signal control system sending input image signal to the drive circuit, wherein these are collectively referred to as a liquid crystal module.

A liquid crystal cell generally comprises liquid crystal molecules, two substrates encapsulating and holding them in between, and an electrode layer applying voltage to the liquid crystal molecules, and polarizing plate(s) disposed on the outer side thereof. A polarizing plate generally comprises a protective film and a polarizing film, and is obtained by dying the polarizing film made of a polyvinyl alcohol film with iodine, stretching the film, and then stacked with protective films on both surfaces thereof. In a transmission-type liquid crystal display device, the polarizing plates are attached on both sides of the liquid crystal cell, wherein one or more optical compensation sheets are occasionally disposed. In a reflection-type liquid crystal display device, it is general to dispose a reflection plate, the liquid crystal cell, one or more optical compensation sheets and a polarizing plate in this order. The liquid crystal cell takes part in ON-OFF display based on difference in the state of alignment of the liquid crystal molecules, and is applicable to any of transmission-type, reflection-type, and semi-transmission-type displays.

Use of the optical compensation sheet, designed to have optical characteristics optimized at each wavelength of light, can provide a liquid crystal display device less causative of color changes depending on the viewing angle. In these conventional liquid crystal display devices, trials have been made on improvement in the color changes, by controlling wavelength dispersion of retardation of the optical compensation film (Japanese Laid-Open Patent Publication No. 2002-221622). Another trial is made on balancing displayed color, by adjusting in-plane retardation values (Re) of the color filters (Japanese Laid-Open Patent Publication No. H5-196931).

The above-described liquid crystal display devices, however, have failed in improving the color changes over the entire wavelength range, and in improving coloration in oblique views.

SUMMARY OF THE INVENTION

Therefore, an object of the present invention is to provide a liquid crystal display device showing excellent color reproducibility over a wide range of viewing angle.

Also a problem in so-called color shifting, which means coloration in blue or red, when the display is observed in an oblique direction in the black state, has remained unsolved.

Therefore, another object of the present invention is to provide a liquid crystal display device causing no color shifting, or only a reduced level of color shifting, even when it is observed in an oblique direction in the black state.

In one aspect, the present invention provides a liquid crystal display device comprising, at least, a pair of polarizing plates, and a liquid crystal cell, disposed between the pair of polarizing plates, comprising a pair of substrates opposed to each other, an electrode disposed on at least one of the pair of substrates, capable of forming an electric field including a component parallel to the pair of substrates, a liquid crystal layer, of which alignment is controlled, disposed between the pair of substrates, a plurality of pixel regions respectively having first, second and third pixels, and a plurality of color filter layers, respectively having first, second and third color filter layers, each corresponding to the first, second and third pixel regions;

wherein Rth is different between at least two of the first, second and third color filter layers.

As an embodiment of the present invention, the liquid crystal display device wherein the first, second and third color filter layers respectively show a maximum transmittance at a main wavelength of $\lambda_1$, $\lambda_2$ and $\lambda_3$ (unit: nm) respectively, which satisfy a relation, $\lambda_1 < \lambda_2 < \lambda_3$;

wherein Rth of the color filter layers satisfy the relation (I) below:

$$Rth(\lambda_3) > Rth(\lambda_2); \text{ is provided.} \quad (I):$$

As another embodiment of the present invention, the liquid crystal display device wherein the first, second and third color filter layers respectively show a maximum transmittance at a main wavelength of $\lambda_1$, $\lambda_2$ and $\lambda_3$ (unit: nm) respectively, which satisfy a relation, $\lambda_1<\lambda_2<\lambda_3$;

wherein Rth of the color filter layers satisfy the relation (II) below:

$$Rth(\lambda_1)>Rth(\lambda_2); \text{ is provided.} \qquad (II)$$

In the present invention, the electrode, capable of forming an electric field including a component parallel to the pair of substrates, may comprise pixel electrode layers and an opposed electrode layer, or may comprise a pair of electrode layers, at least either of which being transparent, and an electrode layer not to be applied with voltage.

In the present invention, both of said pair of polarizing plates may individually comprise a polarizing film and a protective film provided on at least one surface of said polarizing film, and the protective film may be disposed between the liquid crystal cell and said polarizing film.

According to the present invention, there is provided a liquid crystal display device showing excellent color reproducibility over a wide range of viewing angle. According to the present invention, there is also provided a liquid crystal display device causing no color shifting, or only a reduced level of color shifting, even when it is observed from oblique directions in the black state.

Figure 1:
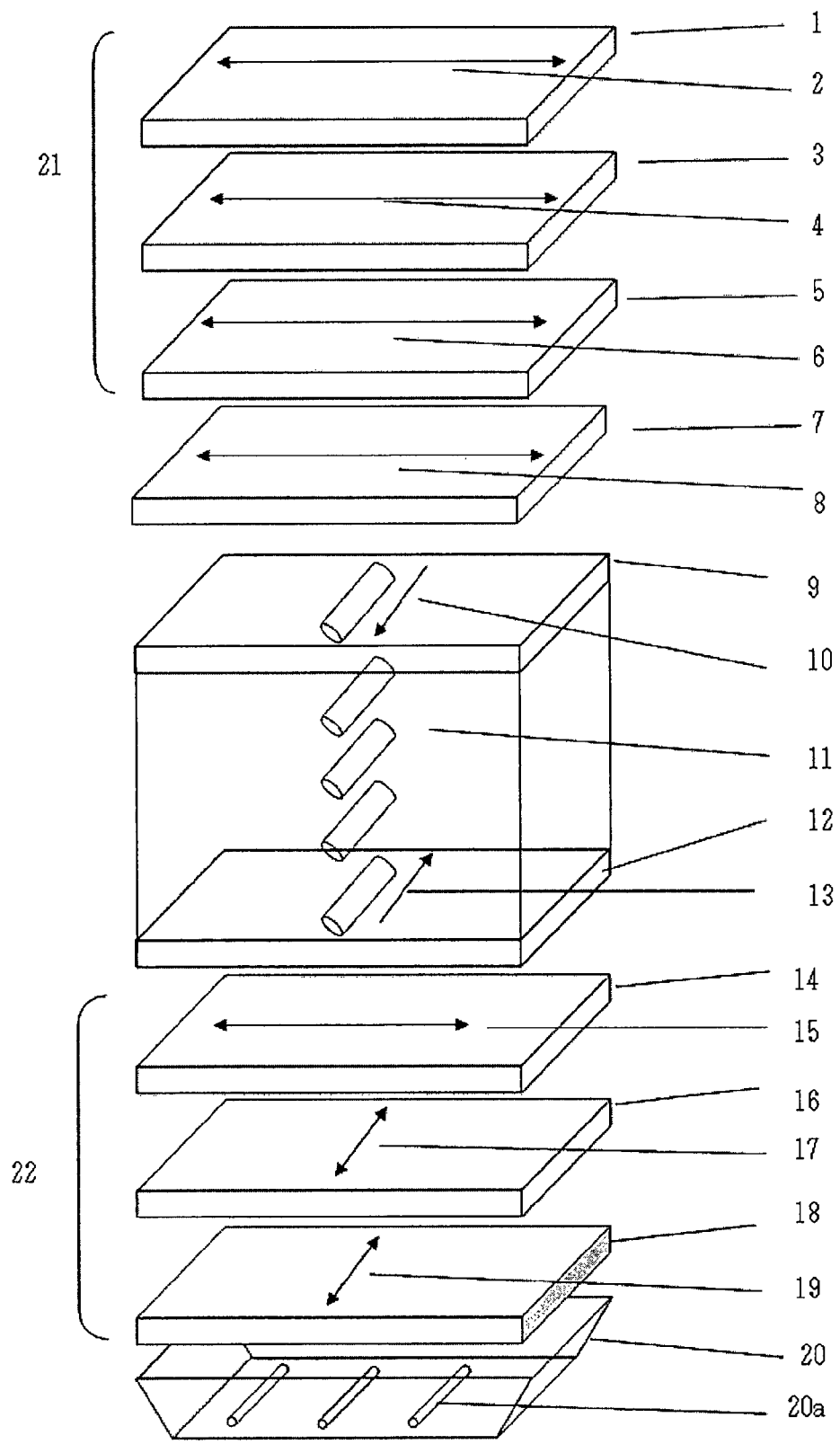
FIG. 1 is a schematic drawing showing an example of the liquid crystal display device of the present invention.

Reference numerals in the drawings express the followings:

1 upper polarizing plate protective film;
2 direction of slow axis of upper polarizing plate protective film;
3 upper polarizing plate polarizing film;
4 absorption axis of polarizing film of upper polarizing plate;
5 protective film of upper polarizing plate on the liquid crystal cell side;
6 direction of slow axis of protective film of upper polarizing plate on the liquid crystal cell side;
7 optically anisotropic film;
8 slow axis of optically anisotropic film;
9 upper substrate of liquid crystal cell;
10 direction of rubbing of upper substrate for aligning liquid crystal molecules;
11 liquid crystal molecule (liquid crystal layer);
12 lower substrate of liquid crystal cell;
13 direction of rubbing of lower substrate for aligning liquid crystal molecules;
14 protective film of lower polarizing plate on the liquid crystal cell side;
15 direction of slow axis of protective film of lower polarizing plate on the liquid crystal cell side;
16 polarizing film of lower polarizing plate;
17 absorption axis of polarizing film of lower polarizing plate;
18 protective film of lower polarizing plate;
19 direction of slow axis of protective film of lower polarizing plate;
20 backlight unit;
20a light source lamp;
21 upper polarizing plate;
22 lower polarizing plate;
23, 23' direction of applied electric field
24 stripe-patterned electrode;
25 insulating layer; and
26 electrode.

DETAILED DESCRIPTION OF THE INVENTION

Paragraphs below will detail embodiments of the present invention. It is to be noted that the expression "to" in this specification means a range expressed by the numerals placed therebefore and thereafter as the lower limit value and the upper limit value, respectively.

In this specification, $Re(\lambda)$ and $Rth(\lambda)$ represent in-plane retardation and in-thickness direction retardation at wavelength $\lambda$, respectively. $Re(\lambda)$ is measured using KOBRA 21ADH or WR (from Oji Scientific Instruments), by irradiating the film with a $\lambda$-nm light in the direction of normal line of the film.

For the case where the film to be measured can be expressed by a monoaxial or biaxial index ellipsoid, $Rth(\lambda)$ can be calculated by the method as described below.

$Rth(\lambda)$ is calculated by KOBRA 21ADH or WR is calculated based on six $Re(\lambda)$ values which are measured for incoming light of a wavelength $\lambda$ nm in six directions which are decided by a 10° step rotation from 0° to 50° with respect to the normal direction of a sample film using an in-plane slow axis, which is decided by KOBRA 21ADH, as an a tilt axis (a rotation axis; defined in an arbitrary in-plane direction if the film has no slow axis in plane); a value of hypothetical mean refractive index; and a value entered as a thickness value of the film.

When a sample film gives no retardation, zero, for incoming light in the direction rotated at a certain angle with respect to the normal direction of the film using an in-plane slow axis as a rotation axis, any retardation values obtained at angles larger than that angle will be calculated by KOBRA 21ADH or WR, after being inverted in the sign to minus.

It is to be noted that Rth can be also calculated from equations (1) and (2) below, based on two retardation values measured for incoming light in two rotated directions, while assuming the slow axis as a tilt axis (a rotation axis: defined in an arbitrary in-plane direction if the film has no slow axis); a hypothetical value of the mean refractive index, and an entered value of the thickness.

$$Re(\theta) = \left[nx - \frac{ny \times nz}{\sqrt{\left\{ny\sin\left(\sin^{-1}\left(\frac{\sin(-\theta)}{nx}\right)\right)\right\}^2 + \left\{nz\cos\left(\sin^{-1}\left(\frac{\sin(-\theta)}{nx}\right)\right)\right\}^2}}\right] \times \frac{d}{\cos\left\{\sin^{-1}\left(\frac{\sin(-\theta)}{nx}\right)\right\}} \qquad \text{Equation (1)}$$

$$Rth = \{(nx+ny)/2 - nz\} \times d \qquad \text{Equation (2)}$$

Notes:

In the equation, $Re(\theta)$ represents retardation value in the direction rotated by angle $\theta$ from the direction of normal line.

In the equations, nx represents in-plane refractive index in the direction of slow axis; ny represents in-plane refractive index in the direction normal to nx; nz represents refractive index in the direction normal to nx and ny; and d is a thickness of the film.

For any films which cannot be expressed by a monoaxial or biaxial index ellipsoid, that is so-called, optic-axis-free film, Rth(λ) is calculated by the procedures below.

The Re(λ) is measured by using KOBRA-21ADH (manufactured by Oji Scientific Instruments) for an incoming light of a wavelength λ nm in a vertical direction to a film-surface. The Rth(λ) is calculated by using KOBRA-21ADH based on plural retardation values which are measured for incoming light of a wavelength λ nm in eleven directions which are decided by a 10° step rotation from −50° to +50° with respect to the vertical direction of the film using an in-plane slow axis, which is decided by KOBRA 21ADH, as an a tilt axis (a rotation axis); value of hypothetical mean refractive index; and a value entered as a thickness value of the film.

In the above-described measurement, the hypothetical value of mean refractive index is available from values listed in catalogues of various optical films in Polymer Handbook (John Wiley & Sons, Inc.). Those having the mean refractive indices unknown can be measured using an Abbe refract meter. Mean refractive indices of some major optical films are listed below:

cellulose acylate (1.48), cycloolefin polymer (1.52), polycarbonate (1.59), polymethylmethacrylate (1.49) and polystyrene (1.59).

KOBRA 21ADH or WR calculates nx, ny and nz, upon enter of the hypothetical values of these mean refractive indices and the film thickness. Base on thus-calculated nx, ny and nz, Nz=(nx−nz)/(nx−ny) is further calculated.

In this specification, with respect to angle, "+" means a direction in a counterclockwise rotation, and "−" means a direction in a clockwise rotation. When the upper direction of an LCD is a 12-o'clock direction and the lower direction of the LCD is a 6-o'clock direction, the direction with an absolute 0° is defined as a 3-o'clock direction (a right direction of the LCD). Also the term of "slow axis" means a direction where the refractive index becomes a maximum value. Also the refractive index is a value measured at λ=550 nm within the visible light region, unless specified otherwise.

In the specification, with respect to angle between the individual axes or directions, terms "parallel with", "normal to", "45°" and the like mean "approximately parallel with", "nearly normal to", "approximately 45°" and the like, and are not strict, allowing deflection to a certain extent so far as the effect of the invention can be obtained. For example, "parallel with" means an angle of crossing of approximately 0°, more specifically −10° to 10°, preferably −5° to 5°, and more preferably −3° to 3°. "Normal to" means an angle of crossing of approximately 90°, more specifically 80° to 100°, preferably 85° to 95°, and more preferably 87° to 93°. The term "45°" means an angle of crossing of approximately 45°, more specifically 35° to 55°, preferably 40° to 50°, and more preferably 42° to 48°.

In this specification, the term "polarizing film" and the term "polarizing plate" are used in a discriminated manner, wherein the "polarizing plate" means a stack of the "polarizing film" and transparent protective film(s) protecting the polarizing film, provided on at least one surface thereof.

The present invention relates to a liquid crystal display device comprising, at least, a pair of polarizing plates, and a liquid crystal cell, disposed between the pair of polarizing plates, comprising a pair of substrates opposed to each other, an electrode disposed on at least one of the pair of substrates, capable of forming an electric field including a component parallel to the pair of substrates, a liquid crystal layer, of which alignment is controlled, disposed between the pair of substrates, a plurality of pixel regions respectively having first, second and third pixels, and a plurality of color filter layers, respectively having first, second and third color filter layers, each corresponding to the first, second and third pixel regions;

wherein Rth is different between at least two of the first, second and third color filter layers.

When the first, second and third color filter layers respectively show a maximum transmittance at a main wavelength of $\lambda_1$, $\lambda_2$ and $\lambda_3$ (unit: nm) respectively, which satisfy a relation, $\lambda_1 < \lambda_2 < \lambda_3$, it is preferable that Rth of the color filter layers satisfy the relation (I) or (II), and more preferable that Rth of the color filter layers satisfy the relation (I) and (II) below:

$$Rth(\lambda_3) > Rth(\lambda_2). \tag{I}$$

$$Rth(\lambda_1) > Rth(\lambda_2). \tag{II}$$

Paragraphs below will explain an embodiment of the present invention, referring to the attached drawings.

The liquid crystal display device shown in FIG. 1 comprises a liquid crystal cell (9 to 13), un upper polarizing plate 21 (1 to 6) and a lower polarizing plate 22 (14 to 19) disposed so as to hold the liquid crystal cell in between, and a backlight unit 20, which serves as a light source, disposed further on the outer side of the lower polarizing plate 22. The liquid crystal cell (9 to 13) comprises a liquid crystal cell upper substrate 9 and a liquid crystal cell lower substrate 12, and a liquid crystal layer 11 held therebetween. The lower substrate 12 has, on the opposing surface thereof, an electrode layer (not shown in FIG. 1), and the electrode layer is configured so as to apply electric field to the liquid crystal layer, in parallel with the surface of the substrate 12. The electrode layer is generally composed of transparent indium tin oxide (ITO). On the electrode layer on the substrate 12, and on the opposing surface of the substrate 9, alignment layers capable of controlling alignment of liquid crystalline molecules 11 (not shown in FIG. 1) are formed, by which the direction of alignment of the liquid crystalline molecules 11 is controlled, depending on the directions of rubbing 10, 13 provided on the surface thereof, when the drive voltage is not applied.

Shapes and configurations of the electrode employed are not specifically limited, and may be anything so far as it can form an electric field in parallel with the substrates of the liquid crystal cell. In general, electrode configurations employed in IPS-mode and FFS-mode liquid crystal display devices are applicable. The electrode may be composed of two or more types of electrode layers disposed at a different position. In one embodiment, the electrode may comprise a plurality of pixel electrode layers and an opposed electrode layer. In another embodiment, the electrode may comprise a pair of electrode layers, at least either of which being transparent, and an electrode layer not to be applied with voltage.

Figure 2:
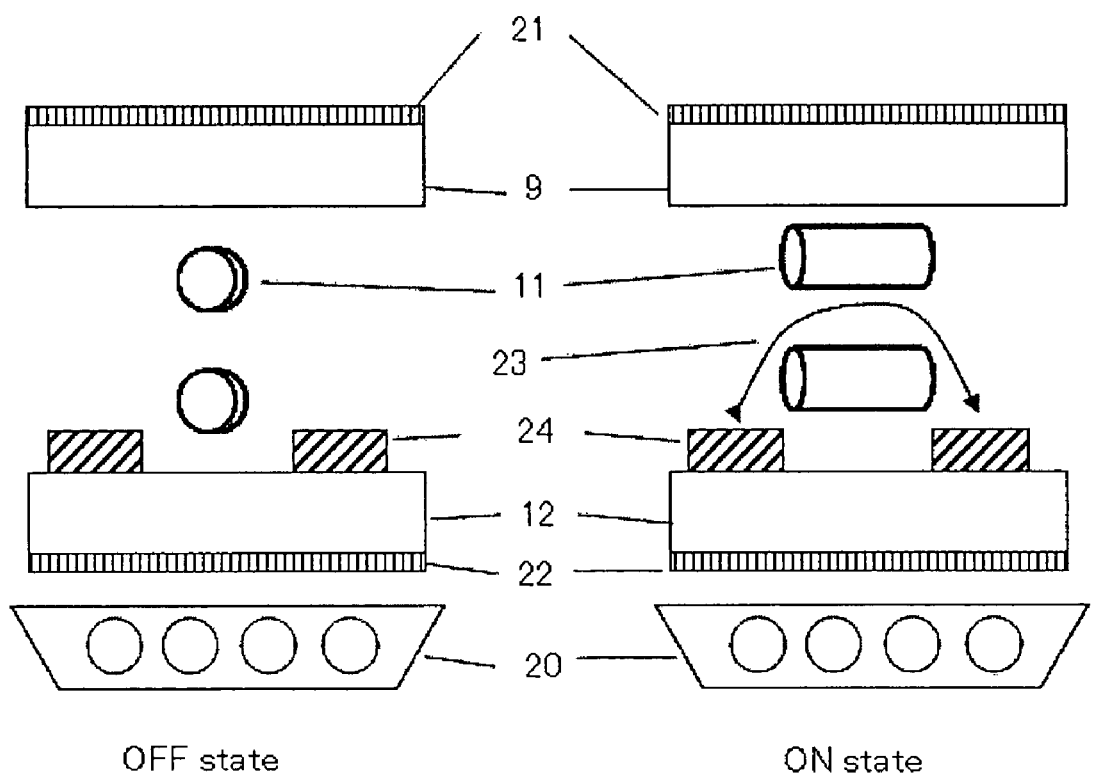
FIG. 2 is a schematic sectional view showing an example of the liquid crystal display device of the present invention.

FIG. 2 schematically shows OFF state and ON state of an exemplary IPS-mode liquid crystal display device. It is to be understood that FIG. 2 shows only a part of a single pixel of the liquid crystal display device, and relative dimensions of the individual components are not necessarily agreed with the real ones. The same will apply also to FIG. 3 described later.

In FIG. 2, any components corresponded to those in FIG. 1 were given with the same reference numerals. The same will apply also to FIG. 3 described later.

In FIG. 2, a plurality of stripe-patterned electrode layers 24 formed on the opposing surface of the substrate 12 can form an electric field 23 containing a component in parallel with the plane of the substrate 12 under voltage application. In the state having no applied voltage or only a low applied voltage (OFF state), the liquid crystalline molecules 11 are controlled as being aligned by the rubbing axes (10 and 13 in FIG. 1) on the opposing surfaces of the substrates 9 and 12, while keeping a certain slight angle away from the longitudinal direction of the stripe-patterned electrode layer 24. In this embodiment, the dielectric constant anisotropy is assumed as being positive. In the state of voltage application through the stripe-patterned electrode layers 24 (ON state), the electric field 23 containing a component in parallel with the substrates 9 and 12 is formed, and the liquid crystalline molecules 11 are aligned so that the long axes thereof are parallel to the direction of electric field. The angle of direction of electric field 23 away from the surface of the substrate 12 is preferably 20° or smaller, more preferably 10° or smaller, that is, substantially in parallel therewith. In this specification, the electric field within an angle of 20° will collectively be expressed as parallel electric field. The stripe-patterned electrode layers 24 will give the same effect if they are formed separatively on the upper and lower substrates, or only on a single substrate.

Figure 3:
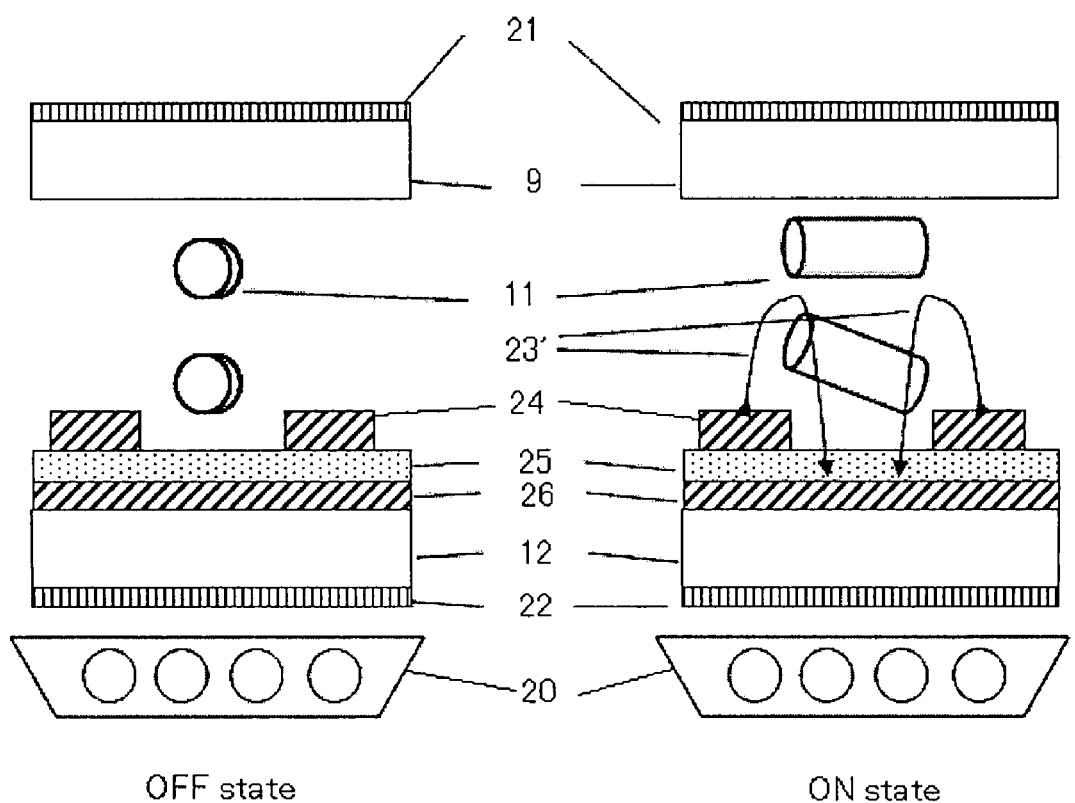
FIG. 3 is a schematic sectional view showing an example of the liquid crystal display device of the present invention.

FIG. 3 schematically shows the OFF state and ON state of an exemplary FFS-mode liquid crystal display device. Any components similar to those in FIG. 2 will be given with same reference numerals, so as to avoid repetitive explanation.

In FIG. 3, the electrode has a double-layered structure composed of an upper electrode layer 24 and a lower electrode layer 26, disposed as separate layers while placing an insulating layer 25 in between. The electrode layer 26 may be an unpatterned electrode layer, or may be a patterned electrode layer typically having a stripe pattern. The upper electrode layer 24 preferably has a stripe pattern, but allows any other patterns such as mesh, spiral, dot and the like, so far as the electric field coming from the lower electrode layer 26 can pass therethrough. It may further comprise a floating electrode having a neutral potential. The insulating layer 25 may be a layer composed of an inorganic material such as SiO or nitride film, or may be a layer composed of an organic material such as acrylic or epoxy-base one. Application of voltage through the upper electrode layer 24 and the lower electrode layer 26 produces an electric field 23' containing a component in parallel with the substrate 9. In the OFF state, similarly to as in the IPS mode, the liquid crystalline molecules 11 are aligned so that the long axes thereof are parallel to the rubbing axes (10 and 13 in FIG. 1) on the opposing surfaces of the substrates 9 and 12. In contrast in the ON state, the electric field 23' containing a component parallel with the substrates 9 and 12 is formed, so that the liquid crystalline molecules 11 are aligned so that the long axes thereof are parallel to the direction of electric field.

Although not shown in FIG. 1 in detail, on the opposing surfaces of the upper substrate 9 or the lower substrate 12 of the liquid crystal cell, a color filter are disposed, and the liquid crystal cell comprises three pixel regions. For example, in an embodiment where the liquid crystal display device shown in FIG. 1 has a color filter composed of red-colored (R) layers, green-colored (G) layers and blue-colored (B) layers, the liquid crystal cell comprises three pixel regions, RGB regions, in which the R layers, the G layers and the B layers are respectively disposed. Of these three colored layers, at least two colored layers, for example, the G layers and the R layers, or the G layers and the B layers, have different Rth values each other. It is more preferable that the Rth values of all of three colored layers differ from each other. The R, G and B colored layers respectively show a maximum transmittance at a main wavelength of $\lambda_R$, $\lambda_G$ and $\lambda_B$ (unit: nm) respectively, and they satisfy a relation below:

$$\lambda_B < \lambda_G < \lambda_R.$$

And, according to this embodiment, it is preferable that Rth of the colored layers in the R regions, the G regions and the B regions satisfies either one of the relations below, and it is more preferable that the Rth satisfy both of the relations below:

$$Rth(\lambda_R) > Rth(\lambda_G)$$

$$Rth(\lambda_B) > Rth(\lambda_G).$$

In order to satisfy the relation(s), the LCD may comprise a color filter composed of R colored layers having a thickness ($d_r$), G colored layers having a thickness ($d_g$), and B colored layers having a thickness ($d_b$), in which at least two of $d_r$, $d_g$ and $d_b$ are different, for example, satisfying $d_r > d_g$ and/or $d_b > d_g$.

Referring now back to FIG. 1, the liquid crystal cell is disposed between the upper polarizing plate 21 and the lower polarizing plate 22, wherein the upper polarizing plate 21 and the lower polarizing plate 22 are disposed so that the absorption axes 4 and 17 thereof are normal to each other. When the upper polarizing plate 21 is disposed as a polarizing plate at the observer's side, the upper polarizing plate 21 is preferably disposed so that the absorption axis 4 thereof is normal to the mean direction of refractive index of the abnormal light of the liquid crystalline molecules 11 in the liquid crystal cell, under no applied voltage (OFF state). The upper polarizing plate 21 comprises a polarizing film 3 and protective films 1 and 5 disposed on the surfaces thereof, and the lower polarizing plate 22 comprises a polarizing film 16 and protective films 14 and 18 disposed on the surfaces thereof.

The protective films disposed on the surfaces of the polarizing film are generally selected from stretched films, and have the slow axes in the direction agreed with the MD (mechanical direction) or in the TD (tenter direction). Directions of the slow axes of two protective films disposed on the surfaces of a single polarizing film may be parallel to each other (2 and 6 in FIG. 1) as shown by the upper polarizing plate 21 in FIG. 1, or may be normal to each other (15 and 19 in FIG. 1) as shown by the lower polarizing plate 22.

Now, an embodiment in which incidence of light comes from the back light unit 20 disposed on the outer side of the lower polarizing plate 22, as shown in FIG. 1, will be discussed.

In the non-operating state (OFF state) without applying the drive voltage to the electrode (not shown in FIG. 1), the liquid crystalline molecules 11 in the liquid crystal layer are aligned so that long axes thereof are approximately parallel to the surfaces of the substrates 9 and 12, and are also parallel to the rubbing axes 10 and 13. In this state, the light given with a predetermined state of polarization by the polarizing film 16 is not affected by birefringence of the liquid crystalline molecules 11, and is consequently blocked by the absorption axis 4 of the polarizing film 3. The black state is thus observed.

On the contrary, in the operating state (ON state) under application of the drive voltage through the electrode (not shown in FIG. 1), the electric field containing a component in parallel with the substrates is formed, and the liquid crystalline molecules 11 are aligned so that the long axes thereof are parallel to the direction of electric field. As a consequence, the light given with a predetermined state of polarization by the polarizing film 18 is altered in the state of polarization by birefringence of the liquid crystalline molecules 11, and therefore can pass through the polarizing film 3. The white state is thus observed.

The color filter, employed in the LCD of the embodiment, comprises a color filter composed first, second and third colored layers respectively having a thickness which is different among the first, second and third pixel regions, and a desirable level of color reproducibility can be obtained over a wide angle of viewing, and coloration in the black state, which is so-called color shifting, is reduced.

In the IPS-mode liquid crystal display device shown in FIG. 2, the liquid crystal layer is preferably disposed so as to adjust the direction of alignment control (rubbing axes 10 and 13 in FIG. 1) thereof to the vertical direction, that is the 12-o'clock-to-6-o'clock direction, of the display device, and also the absorption axes 4 and 17 of the upper polarizing plate and the lower polarizing plate are preferably disposed so as to adjust the absorption axes 4 and 17 thereof to the 12-o'clock-to-6-o'clock direction, that is so as to be normal to each other. It is still also preferable to dispose the polarizing films 3 and 16 so that the absorption axes 4 and 17 thereof are positioned in relation to the slow axes 6 and 15 of the protective films 5 and 14, disposed between the polarizing films 3 and 16 and the liquid crystal layer, in a 12-o'clock-to-6-o'clock direction, and so that the absorption axes 4 and 17 thereof are parallel to the rubbing axes of the liquid crystal cell substrates disposed more closer thereto. This arrangement is effective for reducing leakage light in the black state, and for reducing the coloration depending on angle of viewing.

As shown in FIG. 1, it is still also preferable to dispose an optically anisotropic layer 7 between the liquid-crystal-cell-side protective film 5 of the upper polarizing plate 21 and the liquid crystal layer 11. The retardation value of the optically anisotropic layer 7 is preferably set not larger than twice as large as $\Delta n \cdot d$ value of the liquid crystal layer 11. Although FIG. 1 showed an exemplary configuration where the optically anisotropic layer 7 is disposed between protective film 5 of the upper polarizing plate 21 and the liquid crystal layer 11, the optically anisotropic layer 7 may be disposed between the protective film 14 of the lower polarizing plate 22 and the liquid crystal layer 11, or at both places. The retardation Rth of the protective film 5 of the upper polarizing film 3, adjusted as being larger by 20 nm or more than the retardation Rth of the protective film 14 of the lower polarizing film 16, is effective in view of reducing the leakage light in the black state, and of reducing the coloration depending on angle of viewing.

In the FFS-mode liquid crystal display device shown in FIG. 3, the liquid crystal layer is preferably disposed so that the direction of alignment control (for example, rubbing axes 10 and 13 in FIG. 1) thereof is parallel to the transverse direction, the 3-o'clock-to-9-o'clock direction, of the display device, and also the upper polarizing plate and the lower polarizing plate are preferably disposed so that the absorption axes 4 and 17 thereof are normal to each other and are positioned in a 3-o'clock-to-9-o'clock direction. It is still also preferable to dispose the polarizing films 3 and 16 so that the absorption axes 4 and 17 thereof are positioned in relation to the slow axes 6 and 15 of the protective films 5 and 14, disposed between the polarizing films 3 and 16 and the liquid crystal layer, in a 3-o'clock-to-9-o'clock direction, and so that the absorption axes 4 and 17 thereof are parallel to the rubbing axes of the liquid crystal cell substrates disposed more closer thereto. This arrangement is effective for reducing leakage light in the black state, and for reducing the coloration depending on angle of viewing. As shown in FIG. 1, it is still also preferable to dispose an optically anisotropic layer 7 between the liquid-crystal-cell-side protective film 5 of the upper polarizing plate 21 and the liquid crystal layer 11. The retardation value of the optically anisotropic layer 7 is preferably set not larger than twice as large as $\Delta n \cdot d$ value of the liquid crystal layer 11. Although FIG. 1 showed an exemplary configuration where the optically anisotropic layer 7 is disposed between the protective film 5 of the upper polarizing plate 21 and the liquid crystal layer 11, the optically anisotropic layer 7 may be disposed between the protective film 14 of the lower polarizing plate 22 and the liquid crystal layer 11, or at both places.

The shapes and arrangements of the electrode are not limited to those in the configurations shown in FIGS. 2 and 3, and any shapes and arrangements of the electrodes employed in the conventional IPS-mode and FFS-mode devices are applicable. For example, stripe-patterned electrodes (occasionally referred to as "comb electrodes") can be arranged according to a zigzag pattern, in order to obtain wider angle of viewing. It is, however, to be noted for this case that alignment of the liquid crystalline molecules in the liquid crystal layer may be disturbed at kinked portions of the electrodes, and thereby contrast of the display device may degrade. In order to moderate the decrease in contrast, it is preferable to dispose the protective films (5 and 14 in FIG. 1), such as cellulose acylate films, of the polarizing films (3 and 16 in FIG. 1) so that the slow axes (6 and 15 in FIG. 1) thereof cross with the average alignment control direction (10 and 13 in FIG. 1) of the liquid crystal layer 11 at an angle of 10° or smaller. This arrangement can compensate non-uniformity in the retardation of the liquid crystal layer ascribable to the disturbed alignment, and can improve the uniformity in display. Also non-uniformity in luminance in the black state, ascribable to disturbed alignment of the liquid crystal molecules due to rubbing, can be moderated by disposing the protective films so that the slow axes thereof cross with the rubbing axes, and thereby automatically compensating the non-uniformity in retardation.

The average direction of disturbed alignment of the liquid crystal molecules may be away by approximately 5 to 15° from the target direction of alignment control direction. Non-uniformity in display may be reduced by compensating the retardation with the protective film having the slow axis crossing the average axis of alignment. As described above, the LCD of the invention may comprise a protective film which is disposed so that the slow axis thereof crosses with the average alignment control direction of the liquid crystal layer; and such the protective film may successfully reduce the non-uniformity, but may undesirably increase the absolute black state luminance and consequently degrade the contrast when the protective film has a large Re. And, thus, it is preferable to use a protective film having a small Re.

Further as described in the above, the LCD of the invention may comprise an optically anisotropic layer which is disposed so that the slow axes, direction of controlling alignment, or average direction of alignment thereof crossing with the average alignment control direction of the liquid crystal layer at an angle of 10° or smaller; and such the embodiment can be also reduced in non-uniformity.

The FFS-mode device has a tendency of narrowing the angle of viewing as compared with the IPS-mode device, and is characterized in that alignment of the liquid crystalline molecules are largely disturbed at the ends of the electrodes due to strong electric field applied thereto. For these reasons, a larger effect of reducing the non-uniformity can be obtained, by allowing the slow axes (6 and 15 in FIG. 1) of the protective films (5 and 14 in FIG. 1), typically composed of cellulose acylate films, to cross with the average alignment control direction (10 and 13 in FIG. 1) of the liquid crystal layer 11, at an angle of 10° or smaller.

In any embodiments of both of the IPS-mode and FFS-mode liquid crystal display devices, it is preferable that the absorption axes of both of, or either one of the polarizing plates on the observer's side and the back light side are shifted by an angle within the above-described range away from the slow axis of the protective film, and it is more preferable that the absorption axis of only either one of the polarizing films is shifted by an angle within the above-described range away from the slow axis of the protective film.

Paragraphs below will detail the individual components and so forth applicable to the liquid crystal display device of the present invention.

[Liquid Crystal Material]

Liquid crystal material of the liquid crystal layer employed in the liquid crystal display device of the present invention is not specifically limited. For the liquid crystal display device configured as shown in FIG. 1, a nematic liquid crystal having a positive dielectric constant anisotropy $\Delta \in$, for example, may be used as the liquid crystal material. The thickness (gap) of the liquid crystal layer is preferably adjusted to larger than 2.8 μm and smaller than 4.5 μm or around. By adjusting the retardation ($\Delta n \cdot d$) of the liquid crystal layer to larger than 0.25 μm and less than 0.32 μm, transmission property almost free from wavelength dependence within the visible light region can readily be obtained. Maximum transmittance can be obtained when the liquid crystalline molecules are rotated by 45° away from the direction of rubbing along with the direction of electric field. The thickness (gap) of the liquid crystal layer is controlled by polymer beads. Similar gap can, of course, be obtained also by glass beads or fibers, and resin-made columnar spacers. The liquid crystal material LC is not specifically limited, and may be selected from nematic liquid crystal materials. Lager values of the dielectric constant anisotropy $\Delta \in$ can lower the drive voltage, and smaller values of the refractive index anisotropy $\Delta n$ can increase the thickness (gap) of the liquid crystal layer, making it possible to shorten the time for injecting the liquid crystal, and to reduce variation in the gap.

[Liquid Crystal Cell]

The liquid crystal cell used for the liquid crystal display device of the present invention comprises a pair of substrates disposed as being opposed with each other, at least either one of which having electrodes, and an alignment-controlled liquid crystal layer disposed between the substrates. It is preferable to form the alignment film capable of aligning the liquid crystal molecules, on both opposing surfaces on the inner side of the substrates of the liquid crystal cell. It is preferable to form the color filters on either one of the opposing surfaces. The polarizing film may be disposed inside the liquid crystal cell; and/or the optically anisotropic layer contributive to optical compensation of retardation of the liquid crystal layer may be disposed inside the liquid crystal cell. It is general to dispose columnar or spherical spacers in order to keep a distance (cell gap) between two substrates. Beside these, reflective plate, condenser lens, luminance enhancing film, light emitting layer, fluorescent layer, phosphorescent layer, anti-reflection film, anti-fouling film, hard-coat film and the like may be disposed within the cell.

Transparent glass substrates are generally used as the substrates for the liquid crystal cell, wherein also silicon glass substrates having larger hardness and larger resistance against high temperatures may be used. Plastic substrates excellent in heat resistance, or substrates made of polymer materials may be also used. Flexible and reelable displays can effectively be composed by using the substrates composed of a deformable material. In the reflection-type display device, it is good enough that only one of the substrates is transparent, wherein a metal substrate such as a stainless steel substrate can be adopted for the other.

In the present invention, the liquid crystal display device includes three pixel regions. For example, in a liquid crystal display having a color filter enabling color display, one pixel is generally composed of one set of red, green and blue sub-pixels (pixel regions), corresponded to three principal colors of light. There are some examples of forming one pixel with three of more colors of sub-pixels. As one embodiment of the present invention, a multi-gap configuration, in which the sub-pixels of the individual colors composing one pixel has cell gaps different from each other, can be exemplified.

The LCD of the present invention may employ a multi-domain structure in which one pixel is divided into a plurality of domains, for adjust the color balance and to average the viewing angle characteristics.

[Color Filter]

The LCD of the present invention comprises a plurality of color filter layers, respectively having first, second and third color filter layers, each corresponding to the first, second and third pixel regions, which are preferably disposed on the opposed surface of one of a pair of substrates of the liquid crystal cell. The color filter layers are not specifically limited, for example, respectively having red (R), green (G) and blue (B) layers, each corresponding to the R, G and B pixel regions. In the present invention, Rth is different among at least two of the first, second and third color filter layers; and, preferably, Rth is different among all of the first, second and third color filter layers. One possible embodiment comprises the color filter layers of which thickness is different among at least two of the color filter layers. The thickness is different among at least two of the color filter layers, and, then, Rth is different among at least two of the color filter layers. And the embodiment, comprising the color filter layers of which Rth is different among at least two of the color filter layers, can accomplish the object of the present invention in a more efficient manner.

The color filters can be produce typically by the method described below. First, on the transparent substrate, colored pixels such as red, green and blue ones are formed depending on purposes. As methods of forming the colored pixels such as red, green and blue ones on the transparent substrate, the dying process, the printing process, or the colored resist process coating a colored photo-sensitive resin solution using a spin coater or the like, and then patterning the coated film by photolithographic process, and further the laminating process are applicable. For example in the method of formation involving the coating process, the color filters different in the thickness of the RGB layers can be formed, by adjusting the amount of coating. When the laminating process is adopted, the color filters differing in the thickness of the RGE layers can be formed, by using a transfer material different in the thickness.

For the case where the black matrix is formed using a black photosensitive resin, the black matrix is preferably formed after the colored pixels were formed. This is because, if the black matrix was formed first, the black photo-sensitive resin having a large optical density can cure only in the surficial portion thereof, so that uncured portion of the resin may elute (referred to as side-etching) in the process of the succeeding development, in particular in repetitive development processes carried out in order to form the colored pixels, so that the formed matrix may even peel off in an extreme case.

On the contrary, if the black matrix was formed lastly, the black matrix is surrounded by the colored pixels, and is therefore less causative of permeation of a developing solution from the sectional planes, and is less causative of side-etching, raising a great advantage in that the black matrix having a high optical density can be formed.

Moreover, for the case where the colored layers for forming the colored pixels are formed by the laminating process, formation of the black matrix in advance raises a problem in that the places destined for formation of the colored pixels are confined by the black matrix nearly in a lattice manner, so that laminating may readily result in entrainment of bubbles, whereas formation of the black matrix in the succeeding process does not raise such problem, proved as being desirable.

For the case where the transmittance of light of the colored pixels exceeds 2% in the photo-sensitive wavelength region of the black photo-sensitive resin, it is preferable to preliminarily add a photo-absorbing agent or the like in the colored pixels, so as to lower the transmittance to 2% or below. The photo-absorbing agent applicable herein may be various publicly-known compounds. Examples thereof include benzophenone derivatives (Michler's ketone, etc.), merocyanine compounds, metal oxides, benzotriazole-base compounds, and coumarine-base compounds. Among them, those having desirable photo-absorbing properties, and capable of keeping 25% or more of photo-absorbing performance even after annealing at 200° C. or above are preferable, wherein specific examples thereof include titanium oxide, zinc oxide, benzotriazole-base compounds, and coumarine-base compounds. Among these, coumarine-base compounds are particularly preferable, from both viewpoints of heat resistance and photo-absorbing performance. The above-described annealing at 200° C. or above is intended for further curing of the individual pixels after formation thereof.

Next, a black photo-sensitive resin layer is provided over the entire surface of the transparent substrate so as to cover the pixel patterns, wherein applicable methods include a method of coating the black photo-sensitive resin solution using a spin coater or a roll coater, a method of preliminarily coating the black photo-sensitive resin solution on a temporary support to thereby form an image forming material, and transfer the black photo-sensitive resin layer onto the pixel pattern.

Next, the black photo-sensitive resin layer is illuminated through a photomask, to thereby cure the black photo-sensitive resin layer in the light-intercepted portion having no colored pixels reside therein (black matrix). The colored pixels generally cause slight misalignment as being affected by an alignment error of a light exposure apparatus or thermal expansion of the substrate, causing thickening or thinning of the pixels per se, and are not disposed according to designed dimensions or pitches. This tendency is emphasized particularly on large-sized substrates. For this reason, illumination through a photomask exactly conforming to the designed pixel pitch may result in overlapping of the black matrix and the pixels, or conversely in local production of gaps between the black matrix and the pixels. The overlapped portions appear as projections, and gapped portions cause light leakage, both being undesirable.

The color filters preferably satisfy the relations below:

$$0 \leq Re(630) \leq 10, \text{ and, } |Rth(630)| \leq 25; \text{ and} \quad (I)$$

$$|Re(400)-Re(700)| \leq 10, \text{ and, } |Rth(400)-Rth(700)| \leq 35, \quad (II)$$

(where in the expressions (I) and (II), $Re(\lambda)$ expresses front retardation value (nm) at a wavelength of $\lambda$ nm, and $Rth(\lambda)$ expresses in-thickness direction retardation value (nm) at a wavelength of $\lambda$ nm.)

Re herein expresses in-plane retardation, and the value thereof is preferably as close to zero as possible, in terms of avoiding lowering the front contrast ratio. The color filters having Re of not zero are preferably disposed in the LCD of the present invention so that the slow axes of the color filters are parallel or normal to the absorption axes of the polarizing films.

Rth expresses in-thickness direction retardation, and contributes to improving the color tone characteristics depending on viewing angles in an oblique direction, without lowering the front contrast ratio. By imparting the color filters with Rth satisfying the above-described conditions, the viewing angle characteristics can optically be compensated in a more complete manner pixel by pixel, and the coloration of the liquid crystal display device of the individual display modes in oblique views can be improved (reduced).

When the color filters are produced using transfer materials, the retardation of the color filters may be adjusted typically by adding a retardation enhancing agent or a retardation reducing agent to a photo-sensitive layer or a colored layer, which are the constituent layers of the transfer materials.

Representative examples of the retardation enhancing agent include compounds expressed by the formulae below, and analogues thereof.

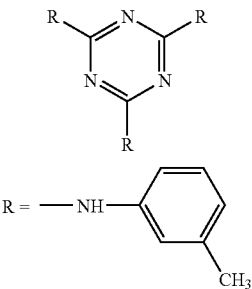

Examples of the retardation moderating agent include compounds expressed by the formula below.

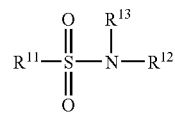

In the above-described formula, $R^{11}$ represents alkyl group or aryl group, $R^{12}$ and $R^{13}$ independently represent hydrogen atom, alkyl group or aryl group. The total number of carbon atoms of $R^{11}$, $R^{12}$ and $R^{13}$ is particularly preferably 10 or above. $R^{11}$, $R^{12}$ and $R^{13}$ may have a substitutive group, wherein preferable examples of the substitutive group include fluorine atom, alkyl group, aryl group, alkoxy group, sulfon group and sulfonamide group, and particularly preferable examples include alkyl group, aryl group, alkoxy group, sulfon group and sulfonamide group. The alkyl group may be any of straight-chain, branched and cyclic, and are preferably those having the number of carbon atoms of 1 to 25, more preferably 6 to 25, and particularly preferably 6 to 20 (for example, methyl group, ethyl group, propyl group, isopropyl group, butyl group, isobutyl group, t-butyl group, amyl group, isoamyl group, t-amyl group, hexyl group, cyclohexyl group, heptyl group, octyl group, bicyclooctyl group, nonyl group, adamantyl group, decyl group, t-octyl group, undecyl group, dodecyl group, tridecyl group, tetradecyl group, pentadecyl group, hexadecyl group, heptadecyl group, octadecyl group, nonadecyl group, didecyl group). The aryl group are preferably those having the number of carbon atoms of 6 to 30, and particularly preferably 6 to 24 (for example, phenyl group, biphenyl group, terphenyl group, naphthyl group, binaphthyl group, triphenylphenyl group).

[Optical Compensation Sheet]

The liquid crystal display device of the present invention may comprise optical compensation sheet(s). The optical compensation sheet is employed in various liquid crystal display devices for the purpose of clearing the coloration of images, and of expanding the angle of viewing. Stretched birefringent polymer film has conventionally been used as the optical compensation sheet. There have been proposed also use of an optical compensation sheet comprising an optically anisotropic layer formed of low-molecular-weight or high-molecular-weight liquid crystalline compound and a transparent support, in place of the optical compensation sheet composed of the stretched birefringent film, or use of an optical compensation sheet comprising an optically anisotropic layer formed of low-molecular-weight or high-molecular-weight liquid crystalline compound and a transparent support, in addition to the optical compensation sheet comprising the stretched birefringent film. Because the liquid crystalline compounds have various modes of alignment, use of the liquid crystalline compound made it possible to realize optical properties which could not have been obtained by the conventional stretched birefringent polymer film alone. The optical compensation sheet capable of function as a protective film for the polarizing plate may be employed. The optical compensation sheet capable of functioning as a substrate of the liquid crystal cell may be also employed. The optical compensation sheet may be formed inside the liquid crystal cell.

Optical properties of the optical compensation sheet may be determined depending on optical properties of the liquid crystal cell, and more specifically depending on difference in the display modes described in the above. Use of the liquid crystalline compound allows preparation of the optical compensation sheet having various optical properties corresponding to various display modes of the liquid crystal cell. There have already been proposed a variety of optical compensation sheets using liquid crystalline compounds having a rod-like, spheroidal and disc shapes. For example, the optical compensation sheet may be employed in IPS-mode displays for compensating viewing angle dependence of the polarizing plates so as to lower the luminance in omni-direction in the black state, and, therefore, can improve viewing angle characteristics in terms of contrast. By designing the optical properties of the optical compensation sheet as being optimized for every wavelength of light, a liquid crystal display device having a wide viewing angle characteristics causing only a small degree of color change can be provided. Combination with a multi-gap or multi-domain structure is particularly preferable. It is also possible to narrow the angle of viewing allowing observation of the display only in a specified direction, rather than expanding the angle of viewing.

Paragraphs below will detail the optical compensation sheet applicable to the present invention, having a support composed of a polymer film or the like, and an optically anisotropic layer formed thereon using a composition containing a liquid crystalline compound.

<<Optically Anisotropic Layer>>

The optically anisotropic layer can be formed by applying a composition containing a liquid crystalline compound to the surface, such as the surface rubbed along a predetermined rubbing axis, allowing molecules of the liquid crystalline compound along with the rubbing axis, and by immobilizing the state of alignment. Examples of the liquid crystalline compound used for forming the optically anisotropic layer include both of rod-like liquid crystalline compound and discotic liquid crystalline compound. The rod-like liquid crystalline compound and the discotic liquid crystalline compound may be high-molecular-weight liquid crystal and low-molecular-weight liquid crystal, including those showing no liquid crystallinity due to cross-linkage of the low-molecular-weight liquid crystal molecules.

<<Rod-Like Liquid Crystalline Molecules>>

Examples of the preferably adoptable rod-like liquid crystalline compound include azomethines, azoxy compounds, cyanobiphenyls, cyanophenyl esters, benzoate ester, cyclohexanecarboxyl phenyl esters, cyanophenylcyclohexanes, cyano-substituted phenylpyrimidines, alkoxy-substituted phenylpyrimidines, phenyldioxanes, tolans and alkenyl cyclohexyl benzonitriles.

Examples of the rod-like liquid crystalline compound include also metal complexes. Also liquid crystal polymers containing the rod-like liquid crystalline moiety in the repetitive units thereof are adoptable as the rod-like liquid crystalline molecules. In other words, the rod-like liquid crystalline molecules may be bound with a (liquid crystal) polymer.

The rod-like liquid crystalline molecules have been described in "Kikan, Kagaku Sosetsu (Quarterly Publication, Chemistry Reviews)", Vol. 22, "Ekisho no Kagaku (Chemistry of Liquid Crystal)" (1994), edited by The Chemical Society of Japan, Chapter 4, Chapter 7 and Chapter 11, and "Ekisho Debaisu Handobukku (A Handbook of Liquid Crystal Display Devices)", edited by No. 142 Committee of Japan Society for the Promotion of Science, Chapter 3. The index of birefringence of the rod-like liquid crystalline molecules preferably falls in the range from 0.001 to 0.7.

The rod-like liquid crystalline molecules preferably have a polymerizable group in order to fix the state of alignment. The polymerizable group is preferably radical-polymerizable unsaturated group or cationic polymerizable group, wherein specific examples thereof include polymerizable groups and polymerizable liquid crystal compounds described, for example, in paragraphs [0064] to [0086] of Japanese Laid-Open Patent Publication No. 2002-62427.

<<Discotic Liquid Crystalline Compound>>

The discotic liquid crystalline compound is aligned nearly normal to the surface of the polymer film. Those described in various literatures (C. Destrade et al., Mol. Crysr. Liq. Cryst., vol. 71, page 111 (1981); "Kikan, KagakuSosetsu (Quarterly Publication, Chemistry Reviews)", Vol. 22, "Ekisho no Kagaku (Chemistry of Liquid Crystal)", edited by The Chemical Society of Japan, Chapter 5, Chapter 10, Section 2 (1994); B. Kohne et al., Angew. Chem. Soc. Chem. Comm., page 1794 (1985); J. Zhang et al., J. Am. Chem. Soc., Vol. 116, page 2655 (1994)) are widely adoptable as the discotic liquid crystalline compound.

The discotic liquid crystalline compound preferably has polymerizable group(s) as being fixable through polymerization, as described for example in Japanese Laid-Open Patent Publication No. H8-27284. For example, one possible structure is such as having polymerizable groups bound as substitutive groups to discotic core of the discotic liquid crystalline compound, wherein direct binding of the polymerizable groups to the discotic core may make it considerably difficult to keep the state of alignment in the process of polymerization reaction. Therefore, the discotic liquid crystalline compound preferably has a linking group between the discotic core and each of the polymerizable groups. In other words, the discotic liquid crystalline compound having the polymerizable groups is preferably a compound expressed by the formula (III) below:

$$D(\text{-L-P})_n \tag{III}$$

In the formula, D represents a discotic core, L represents a divalent linking group, P represents a polymerizable group, and n represents an integer from 4 to 12.

Preferable examples of the discotic core (D), the divalent coupling group (L) and the polymerizable group (P) in the formula (III) are (D1) to (D15), (L1) to (L25), (P1) to (P18), respectively, described in Japanese Laid-Open Patent Publication No. 2001-4837, description of which are preferably adoptable to the present invention.

In the above-described optically anisotropic layer, the molecules of the liquid crystalline compound are preferably aligned nearly normal to the surface of the layer. The rod-like liquid crystalline molecules are preferably aligned while keeping the long axis thereof nearly normal to the surface of the layer, and the discotic liquid crystalline molecules are preferably aligned while keeping the disc plane thereof nearly normal to the surface of the layer. It is to be noted herein that "nearly normal to" means that the long axis of the rod-like liquid crystalline compound or the disc plane of the discotic liquid crystalline molecules are kept in the range of average angle (average angle of inclination) from 70 to 90°. It is preferable that the liquid crystalline molecules are aligned in a substantially uniform manner, preferably immobilized while keeping the substantially uniform alignment, and most preferably immobilized by polymerization reaction.

The optically anisotropic layer is preferably formed by disposing a composition, which contains the liquid crystalline compound, and optionally-added polymerization initiator and other additives described below, on the alignment film. The composition may be prepared as a coating liquid. Organic solvents are preferably used as the solvent used for preparing the coating liquid. Examples of the organic solvents include amides (e.g., N,N-dimethylformamide), sulfoxides (e.g., dimethylsulfoxide), heterocyclic compounds (e.g., pyridine), hydrocarbons (e.g., benzene, hexane), alkylhalide (e.g., chloroform, dichloromethane), esters (e.g., methyl acetate, butyl acetate), ketones (e.g., acetone, methyl ethyl ketone), and ethers (e.g., tetrahydrofuran, 1,2-dimethoxyethane). Alkyl halides and ketones are preferable. Two or more species of organic solvent can be combined. The coating liquid can be coated by publicly-known processes (e.g., extrusion coating process, direct gravure coating process, reverse gravure coating process, die coating process).

<<Fixation of State of Alignment of Liquid Crystalline Compound>>

The aligned liquid crystalline compound molecules are preferably fixed while keeping the state of alignment thereof. The fixation is preferably carried out by polymerization reaction between the polymerizable groups introduced into the liquid crystalline compound. Examples of the polymerization reaction include thermal polymerization reaction using a thermal polymerization initiator, and photo-polymerization reaction using a photo-polymerization initiator, wherein photo-polymerization reaction is more preferable. Examples of the photo-polymerization initiator include α-carbonyl compounds (those described in U.S. Pat. Nos. 2,367,661 and 2,367,670), acyloin ethers (those described in U.S. Pat. No. 2,448,828), α-hydrocarbon-substituted aromatic acyloin compounds (those described in U.S. Pat. No. 2,722,512), polynuclear quinone compounds (those described in U.S. Pat. Nos. 3,046,127 and 2,951,758), combinations of triarylimidazole dimer and p-aminophenyl ketone (those described in U.S. Pat. No. 3,549,367), acrydine and phenazine compounds (those described in Japanese Laid-Open Patent Publication No. S60-105667 and U.S. Pat. No. 4,239,850), and oxadiazole compounds (those described in U.S. Pat. No. 4,212,970).

Amount of use of the photo-polymerization initiator is preferably 0.01 to 20% by mass of the solid content of the coating liquid, and more preferably 0.5 to 5% by mass. Irradiation of light for polymerizing the liquid crystalline compounds is preferably carried out using ultraviolet radiation. Energy of irradiation preferably ranges from 20 mJ/cm$^2$ to 50 J/cm$^2$, and more preferably from 100 to 800 mJ/cm$^2$. The irradiation of light may be carried out under heating, in order to accelerate the photo-polymerization reaction. The thickness of the optically anisotropic layer is preferably 0.1 to 10 μm, and more preferably 0.5 to 5 μm.

<<Vertical Alignment Film>>

It is important to lower the surface energy of the alignment film, in order to vertically align molecules of the liquid crystalline compound on the alignment film side. More specifically, the surface energy of the alignment film is lowered by functional groups of the polymer, and thereby the liquid crystalline compound molecules are kept stand up. As the functional groups capable of lowering the surface energy of the alignment film, fluorine atom and hydrocarbon having 10 or more carbon atoms are effective. In order to allow fluorine atom or hydrocarbon to exist on the surface of the alignment film, it is preferable to introduce fluorine atom(s) or hydrocarbon group(s) into side chains of the polymer, rather than the main chain of the polymer. Fluorine containing polymer preferably contains fluorine atom(s) at a ratio of 0.05 to 80% by mass, more preferably 0.1 to 70% by mass, and still more preferably 0.5 to 65% by mass, and most preferably 1 to 60% by mass. The hydrocarbon group is any of aliphatic group, aromatic group, and combinations of them. The aliphatic group may be any of cyclic, branched and straight ones. The aliphatic group is preferably alkyl group (the meaning includes cycloalkyl group) or alkenyl group (the meaning includes cycloalkenyl group). The hydrocarbon group may have a substitutive group such as halogen atom not showing strong hydrophilicity like halogen atoms. The number of carbon atoms of the hydrocarbon group is preferably 10 to 100, more preferably 10 to 60, and most preferably 10 to 40. The principal chain of the polymer preferably has a polyimide structure or a polyvinyl alcohol structure.

Polyimide is generally synthesized by condensation reaction between the tetracarboxylic acid and diamine. Two or more species of tetracarboxylic acid and two or more species of diamine may be used to synthesize polyimide as a copolymer. Fluorine atom or hydrocarbon group may be contained in a repetitive unit of tetracarboxylic acid, in a repetitive unit of diamine, or in a repetitive unit of the both. For the case where hydrocarbon group is introduced into polyimide, it is preferable to form a steroidal structure in the principal chain or the side chains of polyimide. The steroidal structure contained in the side chains corresponds to a hydrocarbon group having 10 or more carbon atoms, and has a function of vertically aligning the liquid crystalline compound. The steroidal structure referred to in this specification means a cyclopentanohydrophenanthlene ring structure or a cyclic structure in which a part of bonds of the ring is replaced with double bond(s) to a degree an aliphatic ring structure can be maintained (so far as an aromatic ring is not formed).

As a technique of vertically aligning the liquid crystalline compound molecules, a method of mixing an organic acid to a polymer such as polyvinyl alcohol and polyimide can preferably be used. As the acid to be mixed herein, carboxylic acid, sulfonic acid and amino acid are preferably used. It may be also selected from acidic air interface aligning agents described later. The amount of mixing thereof is preferably 0.1% by mass to 20% by mass of the polymer, and more preferably 0.5% by mass to 10% by mass.

In order to uniformly align molecules of the discotic liquid crystalline compound, it is preferable to rub the vertical alignment film so as to control the direction of alignment. The rubbing may be carried out by rubbing the surface of the polymer layer with paper or cloth, in a predetermined direction several times. On the other hand, molecules of the rod-like liquid crystalline compound can be aligned without rubbing. Any of both alignment film preferably has polymerizable groups, for the purpose of improving adhesiveness between the optically anisotropic layer and the transparent supports. The polymerizable group can be introduced in a form of repetitive unit having such polymerizable group in the side chains thereof, or as a substitutive group of the cyclic group. It is more preferable to use an alignment film forming chemical bonds with molecules of the liquid crystalline compound at the interface, such alignment film being described in Japanese Laid-Open Patent Publication No. H9-152509. The thickness of the alignment film is preferably 0.01 to 5 μm, and more preferably 0.05 to 1 μm. It is also possible to once align molecules of the liquid crystalline compound using the alignment film, and to immobilize the molecules of the liquid crystalline compound while keeping the state of alignment unchanged so as to form the optically anisotropic layer, and then to transfer only the optically anisotropic layer onto the support such as polymer film or the like.

<<Air Interface Aligning Agent>>

Molecules of general liquid crystalline compounds have a property of being aligned in an inclined manner on the air interface side, so that it is necessary to vertically align the molecules of the liquid crystalline compound also on the air interface side, in order to obtain a state of uniform vertical alignment. For this purpose, a compound locally distributed on the air interface side, and capable of acting as vertically aligning molecules of the liquid crystalline compound by virtue of its excluded volume effect or electrostatic effect is added to the composition (coating liquid). For the molecules of the discotic liquid crystalline compound, the action of vertically aligning the molecules of the liquid crystalline compound corresponds to the action of reducing the tilt angle of the director, that is, the angle between the director and the surface on the air side. The compound capable of reducing the tilt angle of the director of the discotic liquid crystalline molecules includes those having a plurality of F atoms bound thereto, for the purpose of achieving local distribution on the air interface side, and those having a sulfonyl group or a carboxyl group bound thereto, and additionally having, as being bound thereto, rigid structural units capable of exerting excluded volume effect which allows the liquid crystalline molecules to vertically align, as shown below.

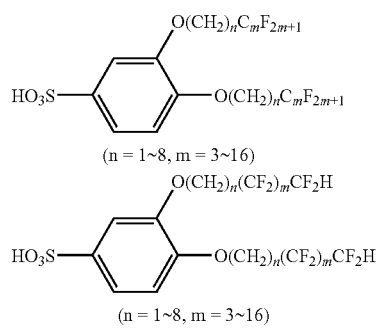

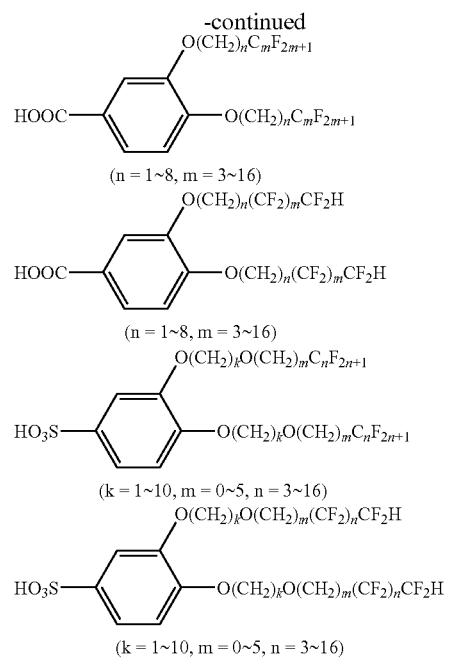

Besides the compounds exemplified in the above, the compounds described in Japanese Laid-Open Patent Publication Nos. 2002-20363 and 2002-129162 can be used as the air interface aligning agent. Contents described in paragraphs [0072] to [0075] of Japanese Laid-Open Patent Publication No. 2004-53981, paragraphs [0038] to [0040] and [0048] to [0049] of 2002-243600, paragraphs [0037] to [0039] of Japanese Laid-Open Patent Publication No. 2002-262239, and paragraphs [0071] to [0078] of Japanese Laid-Open Patent Publication No. 2004-4688 may appropriately be applied to the present invention.

When the air interface aligning agent is used, the amount of addition of the air interface aligning agent in a composition for forming the optically anisotropic layer is preferably adjusted to 0.05% by mass to 5% by mass. When the fluorine-containing saturated air interface aligning agent is used, a content of 1% by mass or less is preferable.

The in-plane retardation (Re) of the optical compensation sheet as a whole is preferably 20 to 200 nm. The in-thickness direction retardation (Rth) of the optical compensation sheet as a whole is preferably 50 to 500 nm.

The optical compensation sheet may comprise a support composed of a polymer film, supporting the above-described optically anisotropic layer. The polymer film used as the support is not specifically limited, and examples thereof include cellulose acylate films, polycarbonate films, polysulfones films, polyethersulfone films, polyacrylates films, polymethacrylate films and norbornene resin films. These polymer films may be a stretched polymer film, or may be a polymer film combined with a polymer layer coated thereon. These polymer films are preferably produced roll-to-roll in the longitudinal direction thereof, in view of improving the productivity, and ensuring geometrical stability even under fluctuation in temperature and humidity.

In an embodiment in which the support of the optically anisotropic layer also functions as the protective film of the polarizing plate, the support is preferably selected from cellulose acylate films described later.

Because liquid crystalline molecules show a variety of modes of alignment, the optically anisotropic layer formed by using the liquid crystalline compound exhibits desired optical properties, in a form of a single layer or a stack of a plurality of layers. In other words, the optical compensation sheet may satisfy optical characteristics required thereto, by contribution of the whole stack composed of a support and one or more optically anisotropic layers formed on the support. In this embodiment, the retardation of the whole optical compensation sheet can be adjusted based on both of optical characteristics of the optically anisotropic layer, and optical characteristics of the support composed of a polymer film.

An optical compensation sheet of a stretched birefringent polymer film may be used for the liquid crystal display device of the present invention. By adjusting conditions for stretching, a stretched birefringent polymer film capable of satisfying optical characteristics required thereto can be produced.

[Polarizing Plate]

In the present invention, a polarizing plate comprising a polarizing film and a pair of protective films holding the polarizing film in between may be employed, or a polarizing plate comprising a polarizing film and a protective film provided at least on one side of the polarizing film may be also employed. For example, the polarizing plate obtained by dying the polarizing film typically composed of a polyvinyl alcohol film with iodine, stretching the film, and then by stacking the protective films on both surfaces thereof. The polarizing film may be disposed inside the liquid crystal cell. In the liquid crystal display device of the present invention, it is preferable to dispose the polarizing plates, each having the polarizing film and a pair of protective films holding the polarizing film in between, so as to hold the liquid crystal cell in between.

<<Polarizing Film>>

The polarizing film (occasionally referred to as "linear polarizing film") includes iodine-containing polarizing film, dye-containing polarizing film containing dichroic dye, and polyene-base polarizing film. The iodine-containing polarizing film and the dye-containing polarizing film are manufactured generally by using polyvinyl alcohol-base film.

The linear polarizing film is preferably a coating-type polarizing film such as those representatively supplied by Optiva Inc., or a polarizing film composed of a binder and iodine or a dichroic dye. Iodine and the dichroic dye in the linear polarizing film exhibit polarizing performance as being aligned in the binder. Iodine and the dichroic dye preferably align along the binder molecules, or unidirectionally align based on self-organization just like the liquid crystal. At present, commercial polarizers are generally produced by dipping a stretched polymer into an iodine bath or a dichroic dye solution, so as to infuse iodine or the dichroic dye into the binder.

The commercial polarizing films contain iodine or the dichroic dye distributed over the range from the surface of the polymer to as deep as 4 µm or around (approximately 8 µm in total on both sides), wherein a thickness of at least 10 µm is necessary in order to obtain a sufficient level of polarizing performance. The degree of infusion can be controlled based on concentration of iodine or dichroic dye solution, temperature of the solution bath, and dipping time. The lower limit of the thickness of the binder is preferably 10 µm as described in the above. As for the upper limit of the thickness, the thinner the better, in view of suppressing light leakage in the liquid crystal display device. It is preferably not thicker than the polarizing plate (approximately 30 µm) commercially available at present, more preferably 25 µm or thinner, and still more preferably 20 µm or thinner. The light leakage will not be observed on a 17-inch liquid crystal display device, if the thickness becomes 20 µm or smaller.

The binder in the polarizing film may be cross-linked. Self-polymerizable polymer may be used as the cross-linked binder. The polarizing film can be formed by allowing the binder, composed of a polymer having functional groups or obtained by introducing functional groups into a polymer, to react with each other while being assisted by light, heat or pH change. The polymer may be introduced with a cross-linked structure using a cross-linking agent. Cross-linkage is generally proceeded by coating a coating liquid containing the polymer or a mixture of the polymer and a cross-linking agent on the surface, followed by heating. Since it is good enough to ensure the durability at the final stage as a commercial product, so that the cross-linking may be carried out at any stage before the final polarizing plate is obtained.

As the binder of the polarizing film, any of both of self-polymerizable polymers, and polymers cross-linkable by the cross-linking agent are adoptable. Polyvinyl alcohol and modified polyvinyl alcohol are most preferable. The modified polyvinyl alcohol are described in the individual publications of Japanese Laid-Open Patent Publication Nos. H8-338913, H9-152509 and H9-316127. Two or more species of polyvinyl alcohol and modified polyvinyl alcohol may be used in combination.

In the polarizing film, the amount of addition of the cross-linking agent for the binder is preferably 0.1 to 20% by mass of the binder. Alignment property of the polarizing device and humidity- and heat-resistance of the polarizing film can be improved.

The alignment film contains a certain amount of unreacted cross-linking agent, even after completion of the cross-linking reaction. The amount of residual cross-linking agent is preferably 1.0% by mass or less in the alignment film, and more preferably 0.5% by mass or less. By this adjustment, lowering in the degree of polarization is avoidable, even when the polarizing film is assembled into the liquid crystal display device, and subjected to long-term use or allowed to stand for a long period under a high-temperature and high-humidity environment.

The cross-linking agent is described in Reissued U.S. Pat. No. 23,297. Also boron compounds (e.g., boric acid, and borax) can be used as the cross-linking agent.

As the dichroic dye, azo dyes, stilbene dyes, pyrazolone dyes, triphenylmethane dyes, quinoline dyes, oxazine dyes, thiazine dyes, and anthraquinone dyes are adoptable. The dichroic dye is preferably water-soluble. The dichroic dye preferably has a hydrophilic substitutive group (e.g., sulfo, amino, hydroxyl groups).

Examples of the dichroic dye are exemplified by those described typically on page 58 of the above-described JIII Journal of Technical Disclosure 2001-1745.

For the case where the polarizing film is produced by the stretching process, the factor of stretching is preferably 2.5 to 30.0 times, and more preferably 3.0 to 10.0 times. The stretching can be carried out by dry stretching in the air. Wet stretching may be also carried out under water. The factor of stretching in the dry stretching is preferably 2.5 to 5.0 times, and the factor of stretching in the wet stretching is preferably 3.0 to 10.0 times. Process of stretching may be divided into several number of times including oblique stretching. Division of the process ensures more uniform stretching even under a large factor of stretching. A slight degree of transverse or longitudinal stretching may precede the oblique stretching (to a degree shrinkage in the transverse direction is avoidable). The stretching can be carried out by tenter stretching in biaxial stretching, under a process differed between the left side and the right side. The biaxial stretching is similar to that adopted for general method of film manufacturing. The biaxial stretching proceeds under different speeds on the left side and on the right side, so that it is necessary to make difference in the thickness of binder film before stretching on the left side and on the right side. In film formation by casting, provision of taper to the die makes difference in the flow rate of a binder solution on the left side and on the right side.

For the case where the polarizing film is produced by the rubbing process, a rubbing process widely applied to the process of aligning liquid crystals in LCD is adoptable. More specifically, the surface of the film is rubbed using paper, gauze, felt, rubber, or nylon or polyester fabric in a predetermined direction so as to achieve alignment. In general, the surface is rubbed several times using a cloth having fibers flocked in an averaged manner with fibers having a uniform length and a uniform thickness. The stretching is preferably carried out using a rubbing roll having all of out-of-roundness, cylindricity and deflection (eccentricity) of 30 μm or below. Angle of wrapping on the rubbing roll is preferably 0.1 to 90° C. It is, however, also possible to achieve stable rubbing by a wrapping of 360° or more, as described in Japanese Laid-Open Patent Publication No. H8-160430.

For the case where a process of rubbing of a long-web film is involved, the film is preferably fed using a conveyor under a constant tension at a speed of 1 to 100 m/min. The rubbing roll is preferably configured as being freely rotatable in the horizontal direction, so as to allow arbitrarily setting of the angle of rubbing. It is preferable to select an appropriate angle of rubbing within the range from 0 to 60°.

The polarizing film used in the present invention preferably has an absorption axis thereof inclined by a predetermined degree of angle away from the longitudinal direction. Provision of a predetermined angle of the absorption axis of the polarizing film away from the longitudinal direction facilitates bonding of the polarizing film with the protective film having the slow axis thereof agreed with the longitudinal direction, in a roll-to-roll manner. For example, typically as described in Japanese Laid-Open Patent Publication No. 2003-207628, a single-plate polarizing plate can be obtained with a good yield, by bonding a pair of long-web-formed protective films on both surfaces of a long-web-formed polarizing film, and by cutting (punching) thus obtained long-web-formed stack according to a desired size.

Moisture permeability of the protective film is one factor capable of improving productivity of the polarizing plate. More specifically, the polarizing film and the protective film are bonded using a water-base adhesive, and the adhesive is dried by allowing the solvent thereof to diffuse through the protective film. The larger the permeability of the protective film is, the faster the drying proceeds, and thereby the productivity improves. However, too large permeability tends to lower the polarizing performance, due to water coming into the polarizing film, depending on an environment of use (under high humidity) of the liquid crystal display device.

<<Protective Film>>

The protective film provided at least on either one surface of the polarizing film preferably satisfies the conditions (1) and (2) below:

Condition (1): Cellulose acylate film satisfying the expressions (I) and (II) below:

$$0 \leq Re(630) \leq 10, \text{ and, } |Rth(630)| \leq 25; \text{ and} \quad (I)$$

$$|Re(400)-Re(700)| \leq 10, \text{ and } |Rth(400)-Rth(700)| \leq 35. \quad (II)$$

Condition (2): Protective film containing an Rth-reducing compound, and having Rth satisfying the expressions (III) and (IV) below:

$$(Rth_{(A)}-Rth_{(O)})/A \leq -1.0; \text{ and} \quad (III)$$

$$0.01 \leq A \leq 30. \quad (IV)$$

In the expressions (III) and (IV), $Rth_{(A)}$ represents Rth (unit: nm) of the protective film containing an Rth-reducing compound, $Rth_{(O)}$ represents Rth (unit: nm) of the protective film containing no Rth-reducing compound, and A represents percentage by mass of the Rth-reducing compound assuming the mass of the source polymer of the film as 100.

The expressions (III) and (IV) in the above are more preferably limited by:

$$(Rth_{(A)}-Rth_{(O)})/A \leq -2.0, \text{ and} \quad (III-I)$$

$$0.1 \leq A \leq 20. \quad (IV-I)$$

The source polymer of the film herein means a source polymer of a major component composing the film, and can be exemplified by cellulose acylate.

Source cellulose for cellulose acylate applicable to the present invention includes cotton linter, and wood pulp (hard-wood pulp, soft-wood pulp), wherein cellulose acylate obtained from both source celluloses can be used, allowing mixed use thereof on occasions. Detailed description of these source celluloses can be found, for example, in "Purasuchikku Zairyo Koza (17) Sen'iso-kei Jushi (Lecture Course of Plastic Materials (17), Fiber-Forming Resins" (written by Marusawa and Uda, published by the Nikkan Kogyo Shimbun Co., Ltd., 1970) and JIII Journal of Technical Disclosure 2001-1745 (p. 7-8), without any specific limitations.

Cellulose acylate adoptable in the present invention is typically such as those having acylated hydroxyl groups of the cellulose, wherein both of acyl groups having 2 to 22 carbon atoms and acetyl group are adoptable as the substitutive group. Although there is no special limitation on the degree of substitution of cellulosic hydroxyl groups of cellulose acylate adoptable to the present invention, it can be calculated based on measured value of the degree of coupling of acetic acid and/or aliphatic acid having 2 to 22 carbon atoms substituting the cellulosic hydroxyl groups. The measurement can be made conforming to ASTM D-817-91.

The degree of substitution of the cellulosic hydroxyl groups in cellulose acylate is not specifically limited, wherein the degree of acyl substitution of the cellulosic hydroxyl groups is preferably 2.50 to 3.00, more preferably 2.75 to 3.00, and still more preferably 2.85 to 3.00.

Of acetic acid and/or aliphatic acid having 3 to 22 carbon atoms substituting the cellulosic hydroxyl groups, the aliphatic acid having 2 to 22 carbon atoms may be aliphatic group or aryl group, and may be a single compound or mixture of two or more species. For example, alkylcarbonyl ester, alkenylcarbonyl ester, aromatic carbonyl ester and aromatic alkylcarbonyl ester and so forth of cellulose can be exemplified. They may have a further-substituted group. Preferable examples of these acyl groups can be exemplified by acetyl group, propionyl group, butanoyl group, heptanoyl group, hexanoyl group, octanoyl group, decanoyl group, dodecanoyl group, tridecanoyl group, tetradecanoyl group, hexadecanoyl group, octadecanoyl group, iso-butanoyl group, tert-butanoyl group, cyclohexanecarbonyl group, oleoyl group, benzoyl group, naphthylcarbonyl group, cinnamoyl group. Among these, acetyl group, propionyl group, butanoyl group, dodecanoyl group, octadecanoyl group, tert-butanoyl group, oleoyl group, benzoyl group, naphthylcarbonyl group and cinnamoyl group are preferable, and acetyl group, propionyl group and butanoyl group are more preferable.

For the case where the above-described acyl substitutive groups to be substituted in the place of hydrogen atoms of the hydroxyl groups of cellulose are substantially composed of at least two species selected from acetyl group, propionyl group and butanoyl group, the total degree of substitution is preferably adjusted to 2.50 to 3.00, and thereby the optical anisotropy of the cellulose acylate film can be reduced. A more preferable degree of acyl substitution is 2.60 to 3.00, wherein more preferable range is 2.65 to 3.00.

The degree of polymerization of cellulose acylate is preferably 180 to 700 on the basis of mean viscometric degree of polymerization, wherein 180 to 550 is more preferable for cellulose acetate, 180 to 400 is still more preferable, and 180 to 350 is particularly preferable. By adjusting the degree of polymerization to a predetermined level or above, the produced film is effectively prevented from being degraded in the strength. The mean degree of polymerization can be measured according to the intrinsic viscosity method proposed by Uda et al (Kazuo Uda and Hideo Saito, "Sen' i Gakkai Shi (Fiber)", Vol. 18, No. 1, p. 105-120, 1962). The method is detailed in Japanese Laid-Open Patent Publication No. H9-95538.

Molecular weight distribution of cellulose acylate preferably used in the present invention can be evaluated by gel permeation chromatography, wherein a multi-dispersibility index Mw/Mn (Mw is mass average molecular weight, and Mn is number average molecular weight) is preferably small, and the molecular weight distribution is preferably narrow. Specifically, a value of Mw/Mn is preferably 1.0 to 3.0, more preferably 1.0 to 2.0, and still more preferably 1.0 to 1.6.

As source materials for the above-described cellulose acylate film, a single material or a mixture of two or more cellulose acylates can preferably be used, while selecting or adjusting the substitutive groups, degree of substitution, degree of polymerization and molecular weight distribution within the above-described ranges.

Cellulose acylate solution (dope) adoptable to manufacturing of the cellulose acylate film may be added with various additives corresponded to purposes of the individual processes for preparation (e.g., compound reducing optical anisotropy, wavelength dispersion adjusting agent, UV absorber, plasticizer, anti-degradation agent, particles, optical characteristic adjusting agent), which will be described below. The additives may be added at any timing during the process of dope preparation, or may be added in a process step newly provided to the last stage of the dope preparation.

First, the compound capable of reducing optical anisotropy of the cellulose acylate film, which is one of the above-described additives adoptable to the dope, will be explained.

The compound is capable of preventing cellulose acylate molecules from aligning in the in-plane and in-thickness directions, and by using a dope added with such a compound, it is possible to produce a film of which optical anisotropy is fully reduced, Re is nearly zero, and Rth is nearly equal to zero. The term "nearly equal to zero" herein typically means allowance within ±2 nm at an arbitrary wavelength. For this purpose, it is advantageous that the optical anisotropy-reducing compound is fully compatible with cellulose acylate, and that the compound does not have rod-like or planar structure. More specifically, when the compound has a plurality of planar functional groups such as aromatic groups, a structure having these functional groups in different planes is advantageous over a structure having them in the same plane Of the compounds capable of reducing the optical anisotropy by preventing cellulose acylate molecules in the film from a lining in-plane or in-thickness direction as described in the above, those having an octanol-water distribution coefficient (LogP value) of 0 to 7 are preferably used. By adopting the compound having a logP value of 7 or smaller, the compound may be improved in the compatibility with cellulose acylate, and thereby clouding and dusting of the film can be prevented in a more effective manner. By adopting the compound having a logP value of 0 or larger, the cellulose acetate film is more effectively prevented from degrading in the water-proofness, by virtue of a large hydrophilicity thereof. More preferable range of the logP value is 1 to 6, and a particularly preferable range is 1.5 to 5.

The octanol-water distribution coefficient (logP value) can be measured by the flask shaking method described in JIS (Japanese Industrial Standards) Z7260-107(2000). The octanol-water distribution coefficient (logP value) can also be estimated by a technique of computational chemistry or an empirical method, rather than actual measurement. The computational methods such as Crippen's fragmentation method (J. Chem. Inf. Comput. Sci., 27, 21(1987)), Viswanadhan's fragmentation method (J. Chem. Inf. Comput. Sci., 29, 163 (1989).), Broto's fragmentation method (Eur. J. Med. Chem.—Chim. Theor., 19, 71(1984)) and the like are preferably used, wherein Crippen's fragmentation method (J. Chem. Inf. Comput. Sci., 27, 21(1987)) is more preferable. If the logP value of a certain compound differs depending on the methods of measurement or calculation, whether the compound is within the scope of the present invention or not is preferably judged by Crippen's fragmentation method.

The compound capable of reducing the optical anisotropy may have an aromatic group or not. The compound capable of reducing the optical anisotropy preferably has a molecular weight of 150 to 3000, more preferably 170 to 2000, and still more preferably 200 to 1000. The compound may have a specific monomer structure, or an oligomer structure composed of a plurality of such monomers bound with each other, so far as the molecular weight thereof falls in the above-described ranges.

The compound capable of reducing the optical anisotropy is preferably a liquid at 25°, or a solid having a melting point of 25 to 250°, and more preferably a liquid at 25°, or a solid having a melting point of 25 to 200°. The compound capable of reducing the optical anisotropy preferably does not vaporize during casting and drying of the dope in the process of producing the cellulose acylate film.

The amount of addition of the compound capable of reducing the optical anisotropy is preferably 0.01 to 30% by mass of cellulose acylate, more preferably 1 to 25% bymass, and particularly preferably 5 to 20% by mass.

The compound capable of reducing the optical anisotropy may be used alone, or in a form of mixture of two or more species thereof at an arbitrary ratio.

The compound capable of reducing the optical anisotropy may be added at any timing during the process of dope preparation, or may be added in the last stage of the dope preparation.

The compound capable of reducing the optical anisotropy is preferably distributed so that an average content of the compound over a range from the surface to as deep as 10% of the total thickness at least on one side accounts for 80 to 99% of an average content of the compound in the center portion of the cellulose acylate film. The content of the compound capable of reducing the optical anisotropy can be determined by infrared absorption spectrometry, typically as described in Japanese Laid-Open Patent Publication No. H8-57879, through measurement of contents of the compound in the surficial portion and the center portion.

Specific examples of the compound capable of reducing the optical anisotropy of the cellulose acylate film are described in paragraphs [0081] to [0214] of Japanese Laid-Open Patent Publication No. 2005-309382, and are applicable to the present invention, without limiting the present invention.

<<Adhesive>>

Adhesive used between the polarizing film and the protective film is not specifically limited, and is exemplified by PVA-base resins (including PVA modified with acetoacetyl group, sulfonate group, carboxyl group or oxyalkylene group), and aqueous solution of boron compounds, wherein PVA-base resins are preferable. The thickness of the adhesive layer after drying is preferably 0.01 to 10 μm, and particularly preferably 0.05 to 5 μm.

<<Successive Producing Process of Polarizing film and Protective Film>>

The polarizing plate used for the present invention is generally produced by stretching the film for forming the polarizing film, and by allowing it to shrink so as to reduce the volatile content ratio, wherein it is preferable to bond the protective film at least on one surface thereof after or during drying, and to heat the stack. In an embodiment in which the protective film also serves as a support of the optical compensation film which functions as an optical compensation layer, it is preferable to bond the protective film on one surface, and to bond the transparent support having thereon the optical compensation film on the opposite side, followed by heating. In one specific method of bonding, the protective film is bonded to the polarizing film using an adhesive, in the process of drying of the film, while being held at both edges thereof, both edges are then slit off, or after the drying, the film for forming the polarizing film is released from the holding portions at both edges thereof, both ends are then slit off, and then bonded with the protective film. As a method of slitting both edges thereof, general techniques such as cutting with a cutter or other cutting tools, and a method of using laser are adoptable. In order to dry the adhesive after the bonding, and to improve the polarization performance, it is preferable to heat the product. Conditions for heating may differ depending on the adhesive, wherein 30° C. or above is preferable for a water-base adhesive, more preferably 40 to 100° C., and still more preferably 50 to 90° C. These processes are further preferably carried out in a through manufacturing line, in view of performance and production efficiency.

<<Performance of Polarizing Plate>>

In view of improving the contrast ratio of the liquid crystal display device of the present invention, larger transmittance and larger degree of polarization are more preferable. The transmittance of the polarizing plate preferably falls in the range from 30 to 50% when measured at a wavelength of 550 nm, more preferably in the range from 35 to 50%, and most preferably in the range from 40 to 50%. The degree of polarization preferably falls in the range from 90 to 100% when measured at a wavelength of 550 nm, more preferably in the range from 95 to 100%, and most preferably in the range from 99 to 100%.

In particular, optical properties and durability (short-term and long-term storability) of the polarizing plate are preferably equivalent to, or better than those of a commercially-available, super-high-contrast product (for example, HLC2-5618 from Sanritz Corporation). More specifically, the polarizing plate preferably has a visible light transmittance of 42.5% or above, a degree of polarization of $\{(Tp-Tc)/(Tp+Tc)\}^{1/2} \leq 0.9995$ (where, Tp represents parallel transmittance, and Tc represents orthogonal transmittance), and rate of change in the transmittance before and after the polarizing plate was allowed to stand in an atmosphere of 60° C., 90% RH for 500 hours, and then in a dry atmosphere of 80° C., for 500 hours, is 3% or below on the basis of the absolute value, and more preferably 1% or below, whereas rate of change in the degree of polarization is 1% or below on the basis of the absolute value, and more preferably 0.1% or below.

The polarizing plate used in the present invention may have, in the topmost portion thereof, an anti-reflection film having an anti-fouling property and friction resistance. The anti-reflection film may be any of those publicly known.

[Elliptic Polarizing Plate]

An elliptic polarizing plate having an optically anisotropic layer is also applicable to the present invention. For example, the elliptic polarizing plate having the protective film, the polarizing film and the optical compensation sheet stacked in this order may be disposed so as to oppose the optical compensation sheet with the liquid crystal cell, in the liquid crystal display device. In thus-configured elliptic polarizing plate, the support (polymer film) of the optical compensation sheet also serves as the protective film of the polarizing film. The elliptic polarizing plate is preferably formed in a geometry nearly identical to a pair of substrates composing the liquid crystal display device, so as to allow direct incorporation thereinto (for example, if the liquid crystal cell is rectangular, also the elliptic polarizing plate is formed in an identical rectangle).

[Back Light]

The liquid crystal display device displays images based on ON/OFF switching of interception of light transmitted through the liquid crystal cell. For the display devices intended for use as the transmission-type ones, a back light using a cold-cathode or hot-cathode fluorescent tube, light emitting diode, field emission element, or electro-luminescence element as a light source can be disposed on the back side, and thereby a bright and clear display device can be provided.

The back light is classified into side-edge-type back light used for portable digital assistants and notebook-type personal computers, and straight-under-type back light used for display device such as television sets. The side-edge type ones have one or two fluorescent lamps disposed on the edge of a light guide plate, raising an advantage of thinning of the back light unit. On the other hand, the straight-under type allows increase in the number of fluorescent lamps depending on necessary level of luminance, raising an advantage of obtaining high luminance. In the side-edge-type and straight-under-type back lights, other structures adopting light emitting diode, field emission element, electroluminescence element and the like, in place of fluorescent lamp, are also effective.

In order to enhance the emission efficiency of the back light, it is also possible to stack a prism-like or lens-like condensing luminance enhancing sheet (film), or to stack a polarizing-reflection-type luminance enhancing sheet (film) capable of improving loss of light due to absorption by the polarizing plate, between the back light and the liquid crystal cell. It is still also preferable to stack a diffusion sheet (film) for uniformalizing the intensity of light from the back light source, or on the contrary, to stack a sheet (film) having reflection or diffusion pattern printed thereon aiming at imparting in-plane distribution to the intensity of light from the light source. The back light not only includes those taking part in fulltime illumination, but also includes those taking part in intermittent illumination, and those allowed to emit light as being divided into a plurality of regions. The light emission system is adjustable in correlation to picture image. The back light may be configured as being divided into a plurality of regions, so as to allow independent emission of different light (luminance and color).

[Field Sequential System]

Full-color display systems using the liquid crystal display device include the spatial mixing system and the time difference mixing system, the latter of which being called field sequential system, wherein the present invention is applicable to the both.

The spatial mixing system stands on a basic principle of additive mixture of colors by which light in red (R), green (G) and blue (B) wavelength regions are overlaid. In LCD, pixels respectively illuminate in R, G and B are disposed in close vicinity and the luminance of the individual pixels are varied, so as to arbitrarily mix these colors to thereby obtain an arbitrary color of light. The LCD based on the spatial mixing system generally adopts color filters. This type of LCD is, however, low in the transmittance because the color expression depends on absorption of light by the color filters, being inferior to the field sequential back light in terms of power consumption.

The field sequential system is a color display system based on "time-divisional" mixture of light. More specifically, the system stands on a principle such that, when two or more colors of light is sequentially allowed to emit, and when the rate of switching exceeds the time resolution of the human eyes, the human can recognize two above-described colors as being mixed.

In the full-color LCD based on the field sequential system, only one color of back light out of three colors (occasionally four colors) of back lights is allowed to emit for every field in motion picture display, and emission is allowed by sequentially (time-divisionally) switching the individual colors of light emission, while raising the rate of switching to a sufficiently quick level so as to obtain an arbitrary color of light.

[Applications]

The Embodiments of the liquid crystal display device of the present invention includes those of direct image viewing type, image projection type, and light modulation type. The direct image viewing type is suitable for OA equipment such as notebook-type personal computer and monitor for personal computer, multi-media display such as television set, small-sized display devices used for car navigation system, mobile phone, personal data assistance, watch-like terminal, wearable display and so forth. It is also effective to display devices for amusement machines, and tall-boy-type or floor-type large-sized displays for conference use.

The image projection type displays include those of front projector type directly projecting images onto a screen, and those of rear projector type projecting images from the back side of the screen. It is also effective for portable projectors using LED light source or the like.

The light modulation type is effective to three-dimensional displays devices, and so-called high-presence display devices. For example, it is effective to three-dimensional displays using two liquid crystal cells, or cylindrical three-dimensional displays composed of a plurality of rear projectors.

EXAMPLES

Paragraphs below will further specifically detail the present invention referring to Examples. Materials, amounts of use, ratio, details of processing, procedures of processing and so forth described in Examples below may appropriately be modified, without departing from the spirit of the present invention. The scope of the present invention is, therefore, not limited to the specific Examples described below.

<Preparation of IPS-Mode Liquid Crystal Cell>

On one glass substrate, the electrodes were provided so as to keep a distance of 20 μm between every adjacent electrodes, a polyimide film was provided further thereon as an alignment film, and rubbed. A polyimide film was also provided on one surface of separately-obtained glass substrate, and rubbed to thereby make the alignment film. Two these glass substrates were stacked and bonded, so as to make the alignment films opposed with each other, while keeping a distance (gap; d) of 4.0 μm between the substrates, so that the direction of rubbing of two glass substrates were parallel to each other; and a nematic liquid crystal composition having a refractive index anisotropy (Δn) of 0.0769 and a dielectric constant anisotropy (Δ∈) of +4.5 was injected. The liquid crystal layer was found to have a d·Δn value of 310 nm.

<Preparation of Polarizing film>

Both surfaces of PVA film were cleaned with ion-exchanged water at a flow rate of 2 liter/min, and blown with air so as to blow the surface water, and to reduce foreign matters adhered on the surface to as scarce as 0.5% or below, the PVA film was then dipped into an aqueous solution containing 1.0 g/liter of iodine, and 60.0 g/liter of potassium iodide at 25° C. for 90 seconds, further dipped into an aqueous solution containing 40 g/liter of boric acid, and 30 g/liter of potassium iodide at 25° C. for 120 seconds, introduced into a tenter stretcher, stretched once by a factor of 7.0 under an atmosphere of 40° C. and 95% RH, and then shrunk down to a factor of 5.3, kept in a constant width thereafter, dried at 60° C., and then separated from the tenter. The water content of the PVA film before the stretching was 30%, whereas the water content after drying was 1.5%. The elastic modulus of the PVA film before stretching was 35 MPa at 40° C., under a 95% RH atmosphere.

Example 1

Preparation of Polarizing Plate

An upper polarizing plate was produced by bonding cellulose acylate films (Re=0.5 nm, Rth=0.2 nm) respectively on both sides of the polarizing film produced as described in the above, using an acrylic adhesive, so that the slow axes thereof and the absorption axis of the polarizing film were parallel to each other.

A lower polarizing plate was produced by bonding cellulose acylate film (Re=0.5 nm, Rth=0.2 nm) respectively on both sides of the polarizing film produced as described in the above, using an acrylic adhesive. They were stacked so that the slow axes of the protective films crossed with the absorption axes of the polarizing film at an angle within ±2°.

(Preparation of Liquid Crystal Display Device)

The polarizing plates were bonded on both surfaces of the liquid crystal cell using an adhesive, to thereby produce the liquid crystal display device. The polarizing plate (upper polarizing plate) on the observer's side was stacked so that the absorption axis thereof crossed normal with the direction of refraction of abnormal light exhibited by the liquid crystal composition in the liquid crystal cell under no applied voltage. The polarizing plates on the observer's side and on the back light side were disposed so that the absorption axes thereof crossed normal to each other.

(Preparation of Color Filter)

On the surface of one of two glass substrates of the liquid crystal cell, color filters were formed according to the method described in Japanese Laid-Open Patent Publication No. H10-221518, using Transer color filter from FUJIFILM Corporation. The surface irregularity of Transer color filter was found to be 0.2 micrometers or below.

In this process, the in-thickness direction retardation, Rth, values of the individual colored layers were varied by varying the thickness of the color filters for the individual colors of blue, green and red, wherein Rth values of the blue layer (450 nm), the green layer (550 nm) and the red layer (650 nm) were adjusted to 8 nm, 1 nm and 5 nm, respectively.

(Optical Performance of Liquid Crystal Display Device)

Thus-produced liquid crystal display device was disposed on a field-sequential back light composed of three LED light sources for RGB, applied with a white level voltage of 2 V, and a black level voltage of 5 V, and front contrast of the panel (ratio of transmittance in the white state and in the black state), and transmittance in the black state at a polar angle of 60° and at an azimuth from 0 to 360° with a 5° pitch, were measured using a luminance meter (SR-3 from Topcon Corporation). Maximum transmittance values were shown in Table 1. It was found from the results in this Table, that the display device was less causative of leakage of light in the blue, green and red states, and showed only a small coloration in oblique views.

Example 2

The thickness of the color filters of the individual colors of blue, green and red were varied in Example 1, and a color filter to thereby vary the in-thickness direction Rth of the individual colored layers, while adjusting Rth of the blue layer (450 nm) to 12 nm, Rth of the green layer (550 nm) to 5 nm, and Rth of the red layer (650 nm) to 15 nm, leaving any other configuration unchanged.

The liquid crystal display device of this Example was found to be further reduced in the transmittance of the individual colors in oblique directions, and further improved in the coloration, as compared with the liquid crystal display device of Example 1.

COMPARATIVE EXAMPLE

Measurement was carried out similarly to as in Example 1, except that the color filters were not stacked, and leakage of light of the individual colors was observed. Results are shown in Table 1. It is known from the results shown in this Table, that transmittance of red light was particularly large in the black state, indicating that the display was colored in red.

TABLE 1

| | Front CR | Transmittance of leaked blue light | Transmittance of leaked green light | Transmittance of leaked red light |
|---|---|---|---|---|
| Example 1 | 1200 | 0.05% | 0.03% | 0.08% |
| Example 2 | 1200 | 0.04% | 0.02% | 0.04% |
| Comparative Example | 1200 | 0.08% | 0.03% | 0.12% |

What is claimed is:

1. A liquid crystal display device comprising, at least, a pair of polarizing plates, and a liquid crystal cell, disposed between the pair of polarizing plates, comprising
a pair of substrates opposed to each other,
an electrode disposed on at least one of the pair of substrates, capable of forming an electric field including a component parallel to the pair of substrates,
a liquid crystal layer, of which alignment is controlled, disposed between the pair of substrates,
a plurality of pixel regions respectively having first, second and third pixels, and
a plurality of color filter layers, respectively having first, second and third color filter layers, each corresponding to the first, second and third pixel regions;
wherein Rth is different between at least two of the first, second and third color filter layers;
wherein the color filter layers satisfy expressions (I) and (II):

$$0 \leq \text{Re}(630) \leq 10, \text{ and } |\text{Rth}(630)| \leq 25; \text{ and} \quad \text{(I)}$$

$$|\text{Re}(400) - \text{Re}(700)| \leq 10, \text{ and } |\text{Rth}(400) - \text{Rth}(700)| \leq 35, \quad \text{(II)}$$

where in the expressions (I) and (II), $\text{Re}(\lambda)$ expresses front retardation value at a wavelength of $\lambda$ nm, and $\text{Rth}(\lambda)$ expresses in-thickness direction retardation value at a wavelength of $\lambda$ nm.

2. The liquid crystal display device of claim 1, wherein the first, second and third color filter layers respectively show a maximum transmittance at a main wavelength of $\lambda_1$, $\lambda_2$ and $\lambda_3$ (unit: nm) respectively, which satisfy a relation, $\lambda_1 < \lambda_2 > \lambda_3$;
wherein Rth values of the color filter layers satisfy the relation (I) below:

$$\text{Rth}(\lambda_3) > \text{Rth}(\lambda_2). \quad \text{(I)}$$

3. The liquid crystal display device of claim 1, wherein the first, second and third color filter layers respectively show a maximum transmittance at a main wavelength of $\lambda_1$, $\lambda_2$ and $\lambda_3$ (unit: nm) respectively, which satisfy a relation, $\lambda_1 < \lambda_2 < \lambda_3$;
wherein Rth values of the color filter layers satisfy the relation (II) below:

$$\text{Rth}(\lambda_1) > \text{Rth}(\lambda_2). \quad \text{(II)}.$$

4. The liquid crystal display device of claim 1, wherein the electrode, capable of forming an electric field including a component parallel to the pair of substrates, comprise pixel electrode layers and an opposed electrode layer.

5. The liquid crystal display device of claim 1, wherein the electrode, capable of forming an electric field including a component parallel to the pair of substrates, comprise a pair of electrode layers, at least either of which being transparent, and an electrode layer not to be applied with voltage.

6. The liquid crystal display device of claim 1, wherein both of said pair of polarizing plates individually comprise a polarizing film and a protective film provided on at least one surface of said polarizing film, wherein said protective film is disposed between the liquid crystal cell and said polarizing film.

* * * * *